US011958558B2

(12) United States Patent
Buchanan

(10) Patent No.: US 11,958,558 B2
(45) Date of Patent: Apr. 16, 2024

(54) VEHICLE CONTROL SYSTEMS AND METHODS AND RELATED VEHICLES

(71) Applicant: MTD Products Inc, Valley City, OH (US)

(72) Inventor: Peter Buchanan, Hudson, OH (US)

(73) Assignee: MTD Products Inc, Valley City, OH (US)

( * ) Notice: Subject to any disclaimer, the term of this patent is extended or adjusted under 35 U.S.C. 154(b) by 618 days.

(21) Appl. No.: 17/027,609

(22) Filed: Sep. 21, 2020

(65) Prior Publication Data

US 2021/0139076 A1 May 13, 2021

Related U.S. Application Data

(63) Continuation of application No. 14/346,690, filed as application No. PCT/US2011/052845 on Sep. 22, 2011, now Pat. No. 10,780,918.

(51) Int. Cl.
| | | |
|---|---|---|
| *B62D 7/20* | (2006.01) | |
| *B62D 7/08* | (2006.01) | |
| *B62D 9/00* | (2006.01) | |
| *B62D 11/00* | (2006.01) | |
| *B62D 11/24* | (2006.01) | |

(52) U.S. Cl.
CPC .................. *B62D 7/20* (2013.01); *B62D 7/08* (2013.01); *B62D 9/00* (2013.01); *B62D 11/006* (2013.01); *B62D 11/24* (2013.01)

(58) Field of Classification Search
CPC ... B62D 7/20; B62D 7/08; B62D 9/00; B62D 11/006; B62D 11/24
See application file for complete search history.

(56) References Cited

U.S. PATENT DOCUMENTS

| | | | |
|---|---|---|---|
| 1,748,061 | A | 2/1930 | Claude |
| 1,794,241 | A | 2/1931 | Patterson |
| 2,017,178 | A | 10/1935 | Braukhof |
| 2,446,242 | A | 8/1948 | Orshansky |
| 2,518,824 | A | 8/1950 | Simpson |
| 2,704,112 | A | 3/1955 | Rice |
| 3,151,499 | A | 10/1964 | Roe |
| 3,315,759 | A | 4/1967 | Bohlen |
| 3,351,147 | A | 11/1967 | Williamson |
| 3,362,493 | A | 1/1968 | Davis et al. |
| 3,398,819 | A | 8/1968 | Ruhl et al. |

(Continued)

FOREIGN PATENT DOCUMENTS

| | | |
|---|---|---|
| EP | 0 754 613 | 1/1997 |
| EP | 0 794 104 | 9/1997 |

(Continued)

OTHER PUBLICATIONS

Judgment, Originating Case No. U.S. Appl. No. 90/013,980, filed Nov. 5, 2021, in the United States Court of Appeals for the Federal Circuit, Case: 21-1474, In re: MTD Products Inc.

(Continued)

*Primary Examiner* — Tony H Winner
*Assistant Examiner* — Marlon A Arce
(74) *Attorney, Agent, or Firm* — Norton Rose Fulbright US LLP

(57) ABSTRACT

Systems for controlling the speed and direction of vehicles, including vehicles that have low to zero turning radius capability.

18 Claims, 15 Drawing Sheets

(56) References Cited

U.S. PATENT DOCUMENTS

| | | |
|---|---|---|
| 3,429,392 A | 2/1969 | Ryskamp |
| 3,431,993 A | 3/1969 | Case |
| 3,550,708 A | 12/1970 | Paranythioti |
| 3,572,033 A | 3/1971 | Tolley |
| 3,581,682 A | 6/1971 | Kontranowski |
| 3,612,199 A | 10/1971 | Vissers |
| 3,679,015 A | 7/1972 | Shriver |
| 3,680,723 A | 8/1972 | Seaberg |
| 3,712,403 A | 1/1973 | Pakosh |
| 3,751,754 A | 8/1973 | Quinlan et al. |
| 3,782,488 A | 1/1974 | Williamson |
| 3,812,925 A | 5/1974 | Lauck et al. |
| 3,865,208 A | 2/1975 | Crawshay et al. |
| 3,869,014 A | 3/1975 | Federspiel et al. |
| 3,900,075 A | 8/1975 | Chichester et al. |
| 3,903,977 A | 9/1975 | Gillette et al. |
| 3,913,695 A | 10/1975 | Holdenried et al. |
| 3,916,625 A | 11/1975 | Holtkamp |
| 3,927,527 A | 12/1975 | Engel |
| 4,011,764 A | 3/1977 | Buck et al. |
| 4,029,266 A | 6/1977 | Seaberg |
| 4,100,738 A | 7/1978 | Seaberg et al. |
| 4,242,922 A | 1/1981 | Baudoin |
| 4,273,206 A | 6/1981 | Van der Lely |
| 4,291,779 A | 9/1981 | Mann et al. |
| 4,322,899 A | 4/1982 | Clune |
| 4,337,836 A | 7/1982 | Seaberg |
| 4,339,966 A | 7/1982 | Kraus |
| 4,395,878 A | 8/1983 | Morita et al. |
| 4,399,882 A | 8/1983 | O'Neill et al. |
| 4,514,978 A | 5/1985 | Buschbom et al. |
| 4,541,378 A | 9/1985 | Kitamura |
| 4,565,257 A | 1/1986 | Hanson |
| 4,572,310 A | 2/1986 | Peter |
| 4,598,603 A | 7/1986 | Hiramitsu et al. |
| 4,671,376 A | 6/1987 | Ito et al. |
| 4,790,399 A | 12/1988 | Middlesworth |
| 4,852,679 A | 8/1989 | Fry |
| 4,875,385 A | 10/1989 | Sitrin |
| 4,875,536 A | 10/1989 | Saur et al. |
| 4,882,947 A | 11/1989 | Barnard |
| 4,886,142 A | 12/1989 | Yamaoka et al. |
| 4,891,941 A | 1/1990 | Heintz |
| 4,920,734 A | 5/1990 | Wenzel |
| 4,957,183 A | 9/1990 | Mullett et al. |
| 4,969,533 A | 11/1990 | Holm et al. |
| 4,969,846 A | 11/1990 | Sugimoto |
| 5,042,238 A | 8/1991 | White, III et al. |
| 5,077,959 A | 1/1992 | Wenzel |
| 5,078,222 A | 1/1992 | Hauser |
| 5,087,222 A | 2/1992 | Sterling et al. |
| 5,101,925 A | 4/1992 | Walker |
| 5,127,215 A | 7/1992 | Wenzel |
| 5,136,899 A | 8/1992 | Hoch et al. |
| 5,137,100 A | 8/1992 | Scott et al. |
| RE34,057 E | 9/1992 | Middlesworth |
| 5,143,400 A | 9/1992 | Miller et al. |
| 5,152,382 A | 10/1992 | Hoch et al. |
| 5,208,939 A | 5/1993 | Oulie |
| 5,216,935 A | 6/1993 | Shimamura et al. |
| 5,238,267 A | 8/1993 | Hutchison et al. |
| 5,263,901 A | 11/1993 | Kawakami et al. |
| 5,288,091 A | 2/1994 | Deschamps |
| 5,299,649 A | 4/1994 | Sano et al. |
| 5,427,195 A | 6/1995 | Paul et al. |
| 5,482,130 A | 1/1996 | Shimizu |
| 5,496,226 A | 3/1996 | Splittstoesser et al. |
| 5,520,351 A | 3/1996 | Katoh et al. |
| 5,502,957 A | 4/1996 | Robertson |
| 5,509,496 A | 4/1996 | Erickson et al. |
| 5,511,631 A | 4/1996 | Tsuchihashi et al. |
| 5,517,809 A | 5/1996 | Rich |
| 5,529,135 A | 6/1996 | Wenzel et al. |
| 5,570,570 A | 11/1996 | Klas et al. |
| 5,601,512 A | 2/1997 | Scag |
| 5,766,105 A | 6/1998 | Fellows et al. |
| 5,809,755 A | 9/1998 | Velke et al. |
| 5,848,520 A | 12/1998 | Arfstrom et al. |
| 5,848,664 A | 12/1998 | Kaspar |
| 5,850,886 A | 12/1998 | Kouno et al. |
| 5,913,802 A | 6/1999 | Mullet et al. |
| 5,927,424 A | 6/1999 | Van Den Brink et al. |
| 5,934,400 A | 8/1999 | Larsen et al. |
| 5,941,334 A | 8/1999 | Inagaki et al. |
| 6,038,840 A | 3/2000 | Ishimori et al. |
| 6,092,617 A | 7/2000 | White, III et al. |
| 6,126,564 A | 10/2000 | Irikura et al. |
| 6,129,164 A | 10/2000 | Teal et al. |
| 6,152,248 A | 11/2000 | Hidaka et al. |
| 6,196,342 B1 | 3/2001 | Teal et al. |
| 6,230,829 B1 | 5/2001 | Martin et al. |
| 6,256,357 B1 | 7/2001 | Oshima |
| 6,257,357 B1 | 7/2001 | Teal et al. |
| 6,264,518 B1 | 7/2001 | Price |
| 6,301,864 B1 | 10/2001 | Damie et al. |
| 6,324,939 B1 | 12/2001 | Cicotte |
| 6,343,668 B1 | 2/2002 | Dean |
| 6,374,940 B1 | 4/2002 | Pickert |
| 6,408,960 B1 | 6/2002 | Hidaka et al. |
| 6,434,919 B2 | 8/2002 | Schick |
| 6,435,522 B1 | 8/2002 | Van Den Brink et al. |
| 6,438,931 B1 | 8/2002 | Velke et al. |
| 6,447,419 B1 | 9/2002 | Irikura et al. |
| 6,456,925 B1 | 9/2002 | Romig |
| 6,474,436 B1 | 11/2002 | Konigorski |
| 6,484,827 B2 | 11/2002 | Teal et al. |
| 6,484,828 B2 | 11/2002 | Hidaka et al. |
| 6,523,635 B1 | 2/2003 | Johnson et al. |
| 6,540,633 B1 | 4/2003 | Hasegawa et al. |
| 6,554,085 B2 | 4/2003 | Hasegawa et al. |
| 6,601,663 B2 | 8/2003 | Hauser |
| 6,659,216 B2 | 12/2003 | Irikura et al. |
| 6,668,090 B1 | 12/2003 | Joshi et al. |
| 6,672,411 B1 | 1/2004 | Mouser |
| 6,688,090 B2 | 2/2004 | Velke et al. |
| 6,725,954 B1 | 4/2004 | Keane et al. |
| 6,729,115 B2 | 5/2004 | Bartel |
| 6,771,034 B2 | 8/2004 | Reile et al. |
| 6,808,032 B2 | 10/2004 | Wuertz et al. |
| 6,814,174 B2 | 11/2004 | Fluent et al. |
| 6,830,115 B2 | 12/2004 | Okada et al. |
| 6,874,305 B2 | 4/2005 | Ishimori |
| 6,904,985 B2 | 6/2005 | Ferree et al. |
| 6,905,985 B1 | 6/2005 | Schindzielorz et al. |
| 6,912,831 B2 | 7/2005 | Velke et al. |
| 6,921,109 B2 | 7/2005 | Hutchison et al. |
| 6,945,353 B2 | 9/2005 | Bishop |
| 6,951,259 B2 | 10/2005 | Irikura |
| 6,962,219 B2 | 11/2005 | Hauser |
| 7,004,268 B2 | 2/2006 | Irikura |
| 7,017,327 B2 | 3/2006 | Hunt et al. |
| 7,059,433 B2 | 6/2006 | Hasegawa et al. |
| 7,108,096 B1 | 9/2006 | Oxley et al. |
| 7,237,628 B2 | 7/2007 | Desai et al. |
| 7,237,629 B1 * | 7/2007 | Bland ................. B62D 7/08 56/14.7 |
| 7,347,434 B2 | 3/2008 | Lewis et al. |
| 7,395,912 B2 | 7/2008 | Ooishi et al. |
| 7,422,545 B2 | 9/2008 | Macaluso et al. |
| 7,431,123 B2 | 10/2008 | Irikura et al. |
| 7,533,892 B2 | 5/2009 | Schena et al. |
| 7,574,850 B1 | 8/2009 | Nunez |
| 7,628,780 B2 | 12/2009 | Bonner et al. |
| 7,686,107 B1 | 3/2010 | Bland et al. |
| 7,914,020 B2 | 3/2011 | Boston |
| 7,914,022 B2 * | 3/2011 | Ruebusch ............. B62D 3/02 180/401 |
| 8,011,458 B2 | 6/2011 | Hauser |
| 7,992,659 B2 | 8/2011 | Schaedler et al. |
| 8,136,613 B2 | 3/2012 | Schaedler et al. |
| 8,157,030 B2 | 4/2012 | Greenwood et al. |
| 8,235,166 B2 | 8/2012 | Konrad et al. |
| 1,045,752 A1 | 11/2012 | Scharf |

(56) References Cited

U.S. PATENT DOCUMENTS

| | | | |
|---|---|---|---|
| 8,950,521 B2* | 2/2015 | Piontek | B62D 7/08 |
| | | | 180/6.34 |
| 1,142,051 A1 | 6/2015 | O'Conner | |
| 9,254,865 B2 | 2/2016 | Schaedler et al. | |
| 1,382,909 A1 | 6/2021 | Hennessy et al. | |
| 1,476,068 A1 | 12/2023 | Froelich | |
| 2002/0092685 A1 | 7/2002 | Hauser | |
| 2002/0108800 A1 | 8/2002 | Irikura et al. | |
| 2002/0113564 A1 | 8/2002 | Reile et al. | |
| 2003/0010553 A1 | 1/2003 | Meurer | |
| 2003/0019682 A1 | 1/2003 | Schaedler et al. | |
| 2003/0102171 A1 | 6/2003 | Hauser | |
| 2003/0106725 A1 | 6/2003 | Irikura | |
| 2003/0213625 A1 | 11/2003 | Okada et al. | |
| 2004/0040779 A1 | 3/2004 | Bishop | |
| 2004/0144590 A1 | 7/2004 | Fluent et al. | |
| 2004/0245029 A1 | 12/2004 | Irikura | |
| 2005/0003919 A1 | 1/2005 | Hasegawa et al. | |
| 2005/0011684 A1 | 1/2005 | Uemura et al. | |
| 2005/0023049 A1 | 2/2005 | Ferree et al. | |
| 2005/0145421 A1 | 7/2005 | Ishimori | |
| 2005/0209564 A1 | 9/2005 | Bonner et al. | |
| 2006/0278446 A1 | 12/2006 | Oxley et al. | |
| 2007/0144796 A1 | 6/2007 | Schaedler et al. | |
| 2007/0175676 A1 | 8/2007 | Irikura | |
| 2008/0136134 A1* | 6/2008 | McCoid | B62D 11/04 |
| | | | 74/484 R |
| 2008/0184687 A1* | 8/2008 | Scherbring | A01D 34/64 |
| | | | 56/10.1 |
| 2008/0217092 A1 | 9/2008 | Ruebusch et al. | |
| 2009/0178862 A1 | 7/2009 | Greenwood et al. | |
| 2009/0188728 A1 | 7/2009 | Osborne | |
| 2009/0194965 A1 | 8/2009 | Boston | |
| 2009/0241708 A1 | 10/2009 | Schaedler et al. | |
| 2009/0250270 A1 | 10/2009 | Hauser | |
| 2015/0353131 A1 | 12/2015 | Greenwood et al. | |
| 2020/0377151 A1 | 12/2020 | Schaedler et al. | |
| 2021/0146996 A1 | 5/2021 | Schaedler et al. | |

FOREIGN PATENT DOCUMENTS

| | | |
|---|---|---|
| EP | 0 875 441 | 11/1998 |
| EP | 0 891 913 | 1/1999 |
| EP | 1 000 793 | 5/2000 |
| EP | 1 186 459 | 3/2002 |
| FR | 1 024 104 | 3/1953 |
| GB | 968260 | 9/1964 |
| GB | 2 015 666 | 9/1979 |
| GB | 2 119 328 | 4/1982 |
| GB | 2 173 746 | 10/1986 |
| GB | 2 303 829 | 3/1997 |
| JP | 9-39822 | 2/1997 |
| JP | 2004-149052 | 5/2004 |
| WO | WO 9101240 | 2/1991 |
| WO | WO 02/014136 | 2/2002 |
| WO | WO 02/36410 | 5/2002 |
| WO | WO 02/102644 | 12/2002 |
| WO | WO 2003/100295 | 12/2003 |
| WO | WO 2007/014030 | 2/2007 |
| WO | WO 2007/023140 | 3/2007 |
| WO | WO 2008/060169 | 5/2008 |
| WO | WO 2009/151725 | 12/2009 |

OTHER PUBLICATIONS

U.S. Appl. No. 60/225,286 filed Jul. 18, 2002, Hauser.
U.S. Appl. No. 60/298,760 filed Jan. 30, 2003, Schaedler et al.
"613 Patent Movement Illustration II" filed Aug. 29m 2016 in Case No. IPR2016-00219 for U.S. Pat. No. 8,136,613 as Exhibit 2011.
"613 Patent Movement Illustration" filed Aug. 29, 2016 in Case No. IPR2016-00219 for U.S. Pat. No. 8,136,613 as Exhibit 2010.
"Cub Cadet Reinvents the [Steering] Wheel with New Z Force S, Offering Alternative to Lap Bars", News room, Sep. 30, 2009, filed Feb. 23, 2016 under Case No. IPR2016-00194 for U.S. Pat. No. 8,011,458 as Exhibit 2010 and under Case No. IPR-2016-00219 for U.S. Pat. No. 8,136,613 as Exhibit 2007, (Source URL: https://newsroom.cubcadet.com/newsroom/article/new-articlepage-4).
"Cub Cadet RZT STM ZERO Receives Coveted Popular Mechanics Breakthrough Award", Oct. 14, 2013, filed under Case No. IPR2016-00194 for U.S. Pat. No. 8,011,458 as Exhibit 2002 and under Case No. IPR2016-00219 for U.S. Pat. No. 8,136,613 as Exhibit 2008 (Source URL: http://www.prnewswire.com/news-releases/cub-cadet-rzt-s-zero-receives-coveted-popular-mechanics-breakthrough-award-227668411.html).
"Cub Cadet Z Force S", Living the Country Life, filed Feb. 23, 2016 under Case No. IPR2016-00194 for U.S. Pat. No. 8,011,458 as Exhibit 2010 and under Case No. IPR-2016-00219 for U.S. Pat. No. 8,136,613 as Exhibit 2007, (Source URL: http://www.livingthecountrylife.com/machinery/mowers/cub-cadet-z-force-s/).
"HANDY Magazine's Sneak Peek Video on Cub Cadet RZT S", Ralph Helm Inc Blog, Published Dec. 24, 2011, filed Feb. 23, 2016 under Case No. IPR2016-00194 for U.S. Pat. No. 8,011,458 as Exhibit 2010 and under Case No. IPR2016-00219 for U.S. Pat. No. 8,136,613 as Exhibit 2007, (Source URL: http://blog.ralphhelminc.com/handy-magazines-sneak-peek-video-on-cub-cadet-rzt-s/).
"Hub Motors," filed under Case No. IPR2016-00194 for U.S. Pat. No. 8,011,458 and filed in Case No. IPR2016-01352 for U.S. Pat. No. 9,254,865 (Source URL: http://www.heinzmann.com/en/electric-motors/hub-motor, accessed Nov. 27, 2016).
"Latest mower technology from Big Three", Tools & Equipment | Mower Technology, Oct. 2012, filed Feb. 23, 2016 under Case No. IPR2016-00194 for U.S. Pat. No. 8,011,458 as Exhibit 2010 and under Case No. IPR2016-00219 for U.S. Pat. No. 8,136,613 as Exhibit 2007, (Source URL: http://read.dmtmag.com/i/86038-october-2012).
"Lazer Z® Xp Operator's Manual" eXmark® Mfg. Co. Inc., 13 (2001), available at s:Archive, and last accessed Jan. 22, 2018.
"More Zero-Turn-Radius Mowers Get Safer Steering: Makers of ZTR Riders are Replacing Levers with Steering Wheels," Consumer Reports, published Apr. 1, 2015 filed Oct. 31, 2016 in Case No. IPR2016-01352 for U.S. Pat. No. 9,254,865 as Exhibit 2001 (Source URL: http://www.consumerreports.org/cro/news/2015/04/more-zero-turn-radius-mowers-get-safer-steering/index.htm).
"Planar Linkage," *A Dictionary of Mechanical Engineering*, 1*st* ed., 2013, filed Aug. 29, 2016 in Case No. IPR2016-00219 for U.S. Pat. No. 8, 136,613 as Exhibit 2036.
"Possible Seaberg Orientation," filed Aug. 29, 2016 in Case No. IPR2016-00219 for U.S. Pat. No. 8,136,613 as Exhibit 2012.
"Skid-steer Loaders: 50 Years of Technology," filed Nov. 28, 2016 under Case No. IPR2016-00194 for U.S. Pat. No. 8,011,458 as Exhibit 1035 (Source URL: http://www.landscapeonline.com/research/article.php/7855, accessed Nov. 27, 2016).
"SST15, SST16, and SST18 Spin-Steer Technology™ lawn tractors," Litho in U.S.A., Apr. 2003.
"The Hustler Turf Zero-Turn Mower" The Hustler Turf, filed Oct. 31, 2016 in Case No. IPR2016-01352 for U.S. Pat. No. 9,254,865 as Exhibit 2010 (Source URL: https://www.hustlerturf.com; accessed Oct. 28, 2016).
"TimeCutter® Z TimeCutter® ZX Service Manual" TORO, 2001; A1-6-A1-15, available at https 1962, and last accessed Jan. 22, 2018.
Apr. 20, 2015 Complaint for Patent Infringement in U.S. District Court for the Northern District of Ohio (1:15-cv-00766-PAG), filed under Case No. IPR2016-00194 for U.S. Pat. No. 8,011,458 as Exhibit 2003.
Apr. 20, 2015 Complaint for Patent Infringement in U.S. District Court for the Northern District of Ohio (1:15-cv-00766-PAG), filed under Case No. IPR2016-00219 for U.S. Pat. No. 8,136,613 as Exhibit 2001.
Aug. 29, 2017 Decision Granting Ex Parte Reexamination in Application/Control No. 90/013,980 for U.S. Pat. No. 9,254,865.
Brief for Intervenor—Director of the USPTO filed Jun. 4, 2018 as document 45 in Appeal from the USPTO—Patent Trial and Appeal Board in No. IPR2016-00194, *MTD Products Inc.*, v. *Andrei Iancu, Director*, USPTO, U.S. Court of Appeals for the Federal Circuit, case No. 17-2292.

(56) References Cited

OTHER PUBLICATIONS

Brief for Intervenor—Director of the USPTO filed Jun. 4, 2018 as document 44 in Appeal from the USPTO—Patent Trial and Appeal Board in No. IPR2016-00219, *MTD Products Inc.*, v. *Andrei Iancu, Director*, USPTO, U.S. Court of Appeals for the Federal Circuit, case No. 17-2294.
Burgess, John H., *Designing for Humans: The Human Factor in Engineering*, New Jersey: Petrocelli Books, 1986, filed Aug. 29, 2016 in Case No. IPR2016-00219 for U.S. Pat. No. 8,136,613 as Exhibit 2024.
Burstall, Aubrey F., *A History of Mechanical Engineering*, Faber and Faber: 1963, 241-2, filed Oct. 31, 2016 in Case No. IPR2016-01352 for U.S. Pat. No. 9,254,865 as Exhibit 2007.
Case specification titled "Model 1840: Skid Steer" published by Case Corp., 1998, filed Aug. 29, 2016 in Case No. IPR2016-00219 for U.S. Pat. No. 8,136,613 as Exhibit 2025.
Case specification titled "Model 1845C: Skid Steer" published by Case Corp., 1998, filed Aug. 29, 2016 in Case No. IPR2016-00219 for U.S. Pat. No. 8,136,613 as Exhibit 2026.
Charles Reinholtz Curriculum Vitae filed Aug. 29, 2016 under Case No. IPR2016-00194 for U.S. Pat. No. 8,011,458 as Exhibit 2017.
Corrected Brief of Appellant filed Oct. 23, 2017 as document 21 in Appeal from the USPTO—Patent Trial and Appeal Board in Inter Partes Review No. IPR2016-00194, *MTDP Products Inc.*, v. *The Toro Company*, United States Court of Appeals for the Federal Circuit case No. 17-2292.
Corrected Brief of Appellant filed Oct. 23, 2017 as document 21 in Appeal from the USPTO—Patent Trial and Appeal Board in Inter Partes Review No. IPR2016-00219, *MTDP Products Inc.*, v. *The Toro Company*, United States Court of Appeals for the Federal Circuit case No. 17-2294.
Corrected Petition for Inter Partes Review of U.S. Pat. No. 8,011,458 filed Nov. 25, 2015 under Case No. IPR2016-00194 for U.S. Pat. No. 8,011,458.
Corrected Petitioner's Sur-Reply filed Jan. 4, 2017 for Case No. IPR2016-00194 for U.S. Pat. No. 8,011,458 as Paper 30.
Corrected Petitioner's Sur-Sur Reply filed Jan. 4, 2017 in Case No. IPR2016-00219 for U.S. Pat. No. 8,136,613 as Paper 27.
Curriculum Vitae of Steven Alan Velinsky filed Aug. 29, 2016 in Case No. IPR2016-00219 for U.S. Pat. No. 8,136,613 as Exhibit 2017.
Decision Denying Institution of Inter Partes Review filed Jan. 4, 2017 in Case No. IPR2016-01352 for U.S. Pat. No. 9,254,865 as Paper 9.
Decision Denying Petitioner's Request for Rehearing filed Apr. 11, 2017 in Case No. IPR2016-01352 for U.S. Pat. No. 9,254,865 as Paper 11.
Decision Denying Rehearing Request Filed Oct. 27, 2020 in Appeal No. 2019-001226 for U.S. Pat. No. 9,254,865.
Decision of Inter Partes Review of U.S. Pat. No. 8,011,458 dated May 13, 2016 under Case IPR2016-00194.
Decision of Inter Partes Review of U.S. Pat. No. 8,136,613 dated May 13, 2016 under Case IPR2016-00219.
Decision to Grant for European Patent Application No. 11186249.6 dated Aug. 13, 2015.
Decision to Grant in European Patent Application No. 09763018.0-1755, dated Jan. 30, 2014.
Declaration of Charles Reinholtz filed Aug. 29, 2016 under Case No. IPR2016-00194 for U.S. Pat. No. 8,011,458 as Exhibit 2016.
Declaration of Charles Reinholtz filed Oct. 31, 2016 in Case No. IPR2016-01352 for U.S. Pat. No. 9,254,865 as Exhibit 2002.
Declaration of Charles Reinholtz submitted in U.S. Appl. No. 90/013,980, submitted Jan. 22, 2018.
Declaration of Fred P. Smith filed Jul. 2, 2016, under Case No. IPR2016-01352 for U.S. Pat. No. 9,254,865 as Exhibit 1007.
Declaration of Fred P. Smith filed Nov. 15, 2015 under Case No. IPR2016-00194 for U.S. Pat. No. 8,011,458 as Exhibit 1007.
Declaration of Fred P. Smith filed Nov. 19, 2015 under Case No. IPR2016-00219 for U.S. Pat. No. 8,136,613 as Exhibit 1004.

Declaration of Steven A. Velinksy filed Aug. 29, 2016 in Case No. IPR2016-00219 for U.S. Pat. No. 8,136,613 as Exhibit 2016.
Deposition of Dr. Steven Velinsky filed Nov. 28, 2016 in Case No. IPR2016-00219 for U.S. Pat. No. 8,136,613 as Exhibit 1024.
Deposition of Fred P. Smith recorded Aug. 3, 2016 for Case No. IPR2016-00219 for U.S. Patent No. 8, 136,613, filed Aug. 29, 2016 under Case No. IPR2016-00194 for U.S. Pat. No. 8,011,458 as Exhibit 2044.
Deposition Transcript of Charles Reinholtz filed Nov. 28, 2016 under Case No. IPR2016-00194 for U.S. Pat. No. 8,011,458 as Exhibit 1029.
Deposition Transcript of Fred P. Smith filed Aug. 29, 2016 in Case No. IPR2016-00219 for U.S. Pat. No. 8,136,613 as Exhibit 2015.
Detailed Request for Ex Parte Patent Reexamination, dated Jul. 12, 2017, for U.S. Pat. No. 9,254,865.
Erdman, Arthur G. and George N. Sandor, "Gears and Gear Trains," *Mechanism Design: Analysis and Synthesis*, 3$^{rd}$ ed., vol. 1, 427-444, filed Oct. 31, 2016 in Case No. IPR2016-01352 for U.S. Pat. No. 9,254,865 as Exhibit 2012.
European Office Communication issued in Application No. 07844366.0-1760, dated Jan. 15, 2014.
European Office Communication issued in Application No. 09763018.0-1264, dated Oct. 31, 2012.
Examiner's answer to Appeal Brief filed in U.S. Appl. No. 90/013,980, issued Oct. 10, 2018.
Exmark MFG. Co. Inc., "Exmark All New Lazerz," 1995, pp. 1-4.
Extended European Search Report issued in European Application No. 07844366, dated Jan. 25, 2013.
Extended European Search Report issued in European Application No. 11872538, dated May 24, 2016.
Extended European Search Report issued in European Patent Application No. 09763018.0, dated Dec. 1, 2011.
Extended European Search Report, issued in European Patent Application No. 11184942.8, dated Feb. 2, 2012.
Extended European Search Report, issued in European Patent Application No. 11186249.6, dated Feb. 20, 2012.
Fasold, Danny, "Zero-Turn Mowers: Past, Present, Future," *Green Industry*, Jan. 12, 2009, filed Oct. 31, 2016 in Case No. IPR2016-01352 for U.S. Pat. No. 9,254,865 as Exhibit 2011 (Source URL: http://igin.com/article-880-zts-are-becoming-indispensible-tools-for-staying-competitive-in-this-industry.html; accessed Oct. 28, 2016).
File History for U.S. Pat. No. 9,254,865 filed Jul. 2, 2016 in Case No. IPR2016-01352 for U.S. Pat. No. 9,254,865 as Exhibit 1032.
Final Rejection issued in U.S. Appl. No. 90/013,980, dated May 9, 2018.
Final Written Decision filed May 10, 2017 in Case No. IPR 2016-00194 for U.S. Pat. No. 8,011,458 as paper 41.
Final Written Decision filed May 10, 2017 in Case No. IPR 2016-00219 for U.S. Pat. No. 8,136,613 as paper 38.
Fred P. Smith Curriculum Vitae filed Jul. 2, 2016, under Case No. IPR2016-01352 for U.S. Pat. No. 9,254,865 as Exhibit 1008.
Fred P. Smith Curriculum Vitae filed Nov. 16, 2015 under Case No. IPR2016-00194 for U.S. Pat. No. 8,011,458.
Gordon et al., *1988 Anthropometric Survey of U.S. Army Personnel: Summary Statistics Interim Report*, Yellow Springs, Ohio: Anthropology Research Project, Inc., 1989, filed Aug. 29, 2016 in Case No. IPR2016-00219 for U.S. Pat. No. 8,136,613 as Exhibit 2023.
Hartenberg, Richard S. and Jocques Denavit, Kinematic Synthesis of Linkages, New York: McGraw-Hill, 1964, 49-50, filed Aug. 29, 2016 in Case No. IPR2016-00219 for U.S. Pat. No. 8,136,613 as Exhibit 2020.
Heinzmann "PMSG Motors," Specification filed Aug. 29, 2016 under Case No. IPR2016-00194 for U.S. Pat. No. 8,011,458 as Exhibit 2041.
Hidaka, "Development of forced differential steering control system," Automation Technology for Off-Road Equipment, Proceeding of the Oct. 7-8, 2001 Conference, Kyoto, Japan, Oct. 7, 2004.
Ingeroll, E. P. ed. "A New Graphical Method of Solving Pivot Steering Problems," *The Horseless Age*, vol. 12, No. 21, 1903, 525-528, filed Oct. 31, 2016 in Case No. IPR2016-01352 for U.S. Pat. No. 9,254,865 as Exhibit 2008.
International Preliminary Report on Patentability for International Application No. PCT/US02/19128 dated Oct. 6, 2003.

(56) References Cited

OTHER PUBLICATIONS

International Preliminary Report on Patentability for International Application No. PCT/US01/25565 dated Jun. 13, 2002.
International Search Report and Written Opinion for International Application No. PCT/US02/19128 dated Oct. 1, 2002.
International Search Report and Written Opinion issued for Application No. PCT/US2011/052845, dated Jul. 31, 2012.
International Search Report and Written Opinion, issued in Application No. PCT/US2009/038404, dated Jan. 8, 2010.
International Search Report and Written Opinion, issued in Application No. PCT/US2006/28357, dated Aug. 8, 2007.
International Search Report for International Application No. PCT/US01/25565 dated Mar. 27, 2002.
Judgment filed Feb. 12, 2019 as document 65 in Appeal from the USPTO in No. IPR2016-00219, *MTD Products Inc.* v. *Andrei Iancu*, Under Secretary of Commerce for Intellectual Property and Director of USPTO, U.S. Court of Appeals for the Federal Circuit, case No. 17-2294.
Juvinall, Robert C. and Kurt M. Marshek, "Spur Gears," *Fundamentals of Machine Component Design*, John Wiley & Sons: 2000, 619-632, filed Oct. 31, 2016 in Case No. IPR2016-01352 for U.S. Pat. No. 9,254,865 as Exhibit 2013.
Maxwell, J. C., "On Governors" 1868, filed Nov. 28, 2016 under Case No. IPR2016-00194 for U.S. Pat. No. 8,011,458 as Exhibit 1034.
Minutes of Oral Proceedings for European Patent Application No. 11186249.6 issued Nov. 17, 2014.
MTD website page titled "Careers at MTD—Mechanical Engineer," filed Nov. 28, 2016 under Case No. IPR2016-00194 for U.S. Pat. No. 8,011,458 as Exhibit 1032 and filed in Case No. IPR2016-00219 for U.S. Pat. No. 8,136,613 as Exhibit 1027.
MTD website page titled "Careers at MTD—Product Engineer," filed Nov. 28, 2016 under Case No. IPR2016-00194 for U.S. Pat. No. 8,011,458 as Exhibit 1031 and filed in Case No. IPR2016-00219 for U.S. Pat. No. 8,136,613 as Exhibit 1026.
Myszka, David H., *Machines and Mechanisms: Applied Kinematic Analysis*, New Jersey: Prentice Hall, $2^{nd}$ ed., 2002, 2-3, filed Aug. 29, 2016 in Case No. IPR2016-00219 for U.S. Pat. No. 8,136,613 as Exhibit 2034.
New Zealand Examination Report, issued in Application No. 623986, dated Nov. 7, 2014.
New Zealand Examination Report, issued in Int. App. No. 566485, dated Sep. 24, 2009.
New Zealand Examination Report, issued in Int. App. No. 566486, dated Sep. 29, 2009.
Notice of Allowance issued in U.S. Appl. No. 12/055,668, dated Nov. 14, 2011.
Notice of Allowance issued for U.S. Appl. No. 10/245,158 dated Feb. 10, 2004.
Notice of Allowance issued for U.S. Appl. No. 12/097,875 dated Dec. 13, 2011.
Notice of Allowance issued for U.S. Appl. No. 12/097,872 dated Aug. 20, 2014.
Notice of Allowance issued for U.S. Appl. No. 13/449,174 dated Jul. 12, 2013.
Notice of Allowance issued in Canadian Application No. 2,849,723, dated Mar. 14, 2019.
Notice of Allowance issued in U.S. Appl. No. 11/269,899, dated Apr. 15, 2011.
Notice of Allowance issued in U.S. Appl. No. 11/490,881, dated Oct. 27, 2010.
Notice of Allowance issued in U.S. Appl. No. 11/490,881, dated Apr. 5, 2011.
Notice of Docketing, filed Dec. 30, 2020, from the U.S. Court of Appeals for the Federal Circuit for Federal Circuit Docket No. 2021-1474, and the associated Petition for Review and Patent Owner's Notice of Appeal from the Patent Trial and Appeal Board's adverse decision in Appeal 2019-001226 concerning Reexamination Control U.S. Appl. No. 90/013,980 of U.S. Pat. No. 9,254,865 (59 pages).
Notice of Intention to Grant for European Patent Application No. 06788098.9 dated May 13, 2013.
Notice of Intention to Grant for European Patent Application No. 11186249.6 dated Nov. 27, 2014.
Notice of Intention to Grant for European Patent Application No. 09763018.0 dated Jul. 15, 2013.
Office Action for European Application No. 02749596.9 dated Apr. 16, 2004.
Office Action issued for European Patent Application No. 11184942.8 dated Mar. 12, 2014.
Office Action issued for European Patent Application No. 11184942.8 dated Aug. 4, 2015.
Office action issued for European Patent Application No. 11186249.6 dated Feb. 4, 2013.
Office Action issued for Indian Patent Application No. 844/DELNP/2008 dated Jun. 24, 2015.
Office Action issued in Australian Application No. 2011377602, dated Apr. 5, 2016.
Office Action issued in Australian Application No. 2017202253, dated Nov. 19, 2018.
Office Action issued in Canadian Application No. 2,963,009, dated Nov. 8, 2017.
Office Action issued in Mexican Application No. MX/a/2014/003490, dated Oct. 9, 2017 (partial translation/explanation included).
Office Action issued in Mexican Application No. MX/a/2014/003490, dated May 15, 2018 (partial translation/explanation included).
Office Action issued in Mexican Application No. MX/a/2014/003490, dated Oct. 15, 2018 (partial translation/explanation included).
Office Action issued in U.S. Appl. No. 12/055,668, dated May 25, 2011.
Office Action issued in U.S. Appl. No. 13/425,095 dated Oct. 16, 2012.
Office Action issued in U.S. Appl. No. 13/425,095, dated Mar. 7, 2014.
Office Action issued in U.S. Appl. No. 90/013,980, dated Feb. 8, 2018.
Office Action issued in U.S. Appl. No. 90/013,980, dated Nov. 22, 2017.
Office Action issued in U.S. Appl. No. 14/613,102, dated Nov. 13, 2015.
Office Action issued in U.S. Appl. No. 14/613,102, dated Aug. 23, 2016.
Office Action, in U.S. Appl. No. 11/490,881, dated Feb. 19, 2010.
Office Communication in U.S. Appl. No. 12/097,872 dated Aug. 26, 2013.
Office Communication in U.S. Appl. No. 13/425,095 dated Aug. 2, 2013.
Office Communication issued for U.S. Appl. No. 10/245,158 dated Oct. 7, 2003.
Office Communication issued for U.S. Appl. No. 10/173,172 dated Sep. 30, 2003.
Office Communication issued for U.S. Appl. No. 10/173,172 dated Mar. 17, 2004.
Office Communication issued for U.S. Appl. No. 12/097,875 dated Apr. 8, 2011.
Office Communication issued for U.S. Appl. No. 12/097,872 dated Aug. 26, 2013.
Office Communication issued for U.S. Appl. No. 12/097,872 dated Apr. 29, 2014.
Office Communication issued for U.S. Appl. No. 13/449,174 dated Dec. 12, 2012.
Office Communication issued in U.S. Appl. No. 11/269,899, dated Feb. 6, 2007.
Office Communication issued in U.S. Appl. No. 11/490,881, dated Mar. 13, 2009.
Office Communication issued in U.S. Appl. No. 11/490,881, dated Jul. 2, 2009.
Office Communication issued in European Application No. 06792905.9, issued May 13, 2009.
Office Communication issued in European Application No. 06792907.5, issued Feb. 19, 2009.
Office Communication issued in European Divisional Patent Application No. 11184942.8, dated Jan. 10, 2013.

(56) References Cited

OTHER PUBLICATIONS

Office Communication issued in European Patent Application No. 06792907.5 dated Apr. 19, 2010.
Office Communication issued in European Patent Application No. 06788098.9, dated Feb. 24, 2011.
Office Communication issued in European Patent Application No. 06792905.9, dated Jul. 28, 2010.
Office Communication issued in European Patent Application No. 06788098.9, dated Oct. 12, 2009.
Office Communication issued in Mexican Patent Application No. MX/a/2008/001022, dated May 20, 2011. (English summary provided).
Office Communication issued in U.S. Appl. No. 11/269,899, dated Jun. 15, 2010.
Office Communication issued in U.S. Appl. No. 12/097,875, dated Dec. 13, 2010.
Office Communication issued in U.S. Appl. No. 11/874,130, dated Jan. 22, 2010.
Office Communication issued in U.S. Appl. No. 11/874,130, dated Nov. 29, 2010.
Office Communication issued in U.S. Appl. No. 11/874,130, dated Aug. 18, 2010.
Office Communication issued in U.S. Appl. No. 11/269,899, dated Nov. 19, 2007.
Office Communication issued in U.S. Appl. No. 11/269,899, dated Apr. 1, 2009.
Office Communication dated Apr. 11, 2013 in Canadian Patent Application No. 2,620,119.
Office Communication dated Apr. 9, 2013 in Canadian Patent Application No. 2,620,116.
Office Communication dated May 14, 2013 in Canadian Patent Application No. 2,616,287.
Office Communication, issued in European Patent Application No. 06788098.9, dated Feb. 10, 2012.
Official Communication regarding Written Response to Summons to Attend Oral Proceedings for European Patent Application No. 11186249.6 dated Oct. 10, 2014.
Patent Owner's Appeal Brief filed in U.S. Appl. No. 90/013,980, submitted Sep. 10, 2018.
Patent Owner's Demonstrative Exhibits filed Feb. 2, 2017 in Case No. IPR2016-00219 for U.S. Pat. No. 8,136,613 as Paper 33.
Patent Owner's Demonstrative Exhibits filed Feb. 2, 2017 for Case No. IPR2016-00194 for U.S. Pat. No. 8,011,458 as Paper 36.
Patent Owner's Exhibit List filed Aug. 29, 2016 in Case No. IPR2016-00219 for U.S. Pat. No. 8,136,613 as Paper 15.
Patent Owner's Exhibit List filed Aug. 29, 2016 for Case No. IPR2016-00194 for U.S. Pat. No. 8,011,458 as Paper 18.
Patent Owner's Exhibit List filed Oct. 31, 2016 in Case No. IPR2016-01352 for U.S. Pat. No. 9,254,865 as Paper 7.
Patent Owner's Preliminary Response filed Oct. 31, 2016 in Case No. IPR2016-01352 for U.S. Pat. No. 9,254,865 as Paper 8.
Patent Owner's Preliminary Response of Inter Partes Review of U.S. Pat. No. 8,011,458 dated Feb. 23, 2016 under Case IPR2016-00194.
Patent Owner's Preliminary Response of Inter Partes Review of U.S. Pat. No. 8,136,613 dated Feb. 24, 2016 under Case IPR2016-00219.
Patent Owner's Reply Brief filed in U.S. Appl. No. 90/013,980, submitted Oct. 29, 2019.
Patent Owner's Response filed Aug. 29, 2016 for Case No. IPR2016-00194 for U.S. Pat. No. 8,011,458 as Paper 17.
Patent Owner's Sur-Reply filed Dec. 19, 2016 in Case No. IPR2016-00219 for U.S. Pat. No. 8,136,613 as Paper 22.
Patent Owner's Sur-Reply filed Dec. 19, 2016 for Case No. IPR2016-00194 for U.S. Pat. No. 8,011,458 as Paper 25.
Patent Owners Response filed Aug. 29, 2016 in Case No. IPR2016-00219 for U.S. Pat. No. 8,136,613 as Paper 14.
Paul, Burton, Kinematics and Dynamics of Planar Machinery, New Jersey: Prentice-Hall, 1979, 5-10, filed Aug. 29, 2016 in Case No. IPR2016-00219 for U.S. Pat. No. 8,136,613 as Exhibit 2019.
Petition for Inter Partes Review of U.S. Pat. No. 8,011,458 filed Nov. 16, 2015 under Case No. IPR2016-00194 for U.S. Pat. No. 8,011,458.
Petition for Inter Partes Review of U.S. Pat. No. 8,136,613 filed Nov. 19, 2015 under Case No. IPR2016-00219 for U.S. Pat. No. 8,136,613.
Petition for Inter Partes Review of U.S. Pat. No. 9,254,865 filed Jul. 2, 2016 in Case No. IPR2016-01352 for U.S. Pat. No. 9,254,865 as Paper 1.
Petitioner's Demonstrative Exhibits filed Feb. 2, 2017 in Case No. IPR2016-00219 for U.S. Pat. No. 8,136,613 as Paper 35.
Petitioner's Demonstrative Exhibits filed Feb. 2, 2017 for Case No. IPR2016-00194 for U.S. Pat. No. 8,011,458 as Paper 38.
Petitioner's Exhibit List filed Feb. 23, 2016 under Case No. IPR2016-00194 for U.S. Pat. No. 8,011,458.
Petitioner's Exhibit List filed Feb. 24, 2016 under Case No. IPR2016-00219 for U.S. Pat. No. 8,136,613.
Petitioner's Exhibit List filed Jul. 2, 2016 in Case No. IPR2016-01352 for U.S. Pat. No. 9,254,865 as Paper 3.
Petitioner's Exhibit List filed Nov. 28, 2016 in Case No. IPR2016-00219 for U.S. Pat. No. 8,136,613 as Paper 19.
Petitioner's Exhibit List filed Nov. 28, 2016 for Case No. IPR2016-00194 for U.S. Pat. No. 8,011,458 as Paper 22.
Petitioner's Reply filed Nov. 28, 2016 in Case No. IPR2016-00219 for U.S. Pat. No. 8, 136,613 as Paper 18.
Petitioner's Reply filed Nov. 28, 2016 for Case No. IPR2016-00194 for U.S. Pat. No. 8,011,458 as Paper 21.
Petitioner's Request for Rehearing filed Feb. 3, 2017 in Case No. IPR2016-01352 for U.S. Pat. No. 9,254,865 as Paper 10.
Petitioner's Sur-Reply filed Dec. 26, 2016 in Case No. IPR2016-00219 for U.S. Pat. No. 8,136,613 as Paper 23.
Petitioner's Sur-Reply filed Dec. 26, 2016 for Case No. IPR2016-00194 for U.S. Pat. No. 8,011,458 as Paper 26.
Record of Oral Hearing filed Feb. 28, 2017 in Case No. IPR2016-00219 for U.S. Pat. No. 8,136,613 as Paper 37.
Record of Oral Hearing filed Feb. 28, 2017 for Case No. IPR2016-00194 for U.S. Pat. No. 8,011,458 as Paper 40.
Reply Brief of Appellant filed Aug. 1, 2018 as document 55 in Appeal from the USPTO—Patent Trial and Appeal Board in Inter Partes Review No. IPR2016-00194, *MTD Products Inc.*, v. *Andrei Iancu*, Director, USPTO, United States Court of Appeals for the Federal Circuit case No. 17-2292.
Request for Ex Parte Patent Reexamination Transmittal Form, dated Jul. 12, 2017, for U.S. Pat. No. 9,254,865.
Request for Rehearing, dated May 26, 2020 for U.S. Pat. No. 9,254,865.
Response to Apr. 1, 2009 Office Action submitted in U.S. Appl. No. 11/269,899, dated Oct. 1, 2009.
Response to European Office Communication issued in Application No. 07844366.0-1760, dated Dec. 9, 2013.
Response to European Office Communication issued in Application No. 09763018.0, dated May 8, 2013.
Response to European Office Communication issued in Application No. 09763018.0, dated Nov. 22, 2013.
Response to European Office Communication issued in Application No. 07844366.0, dated Oct. 31, 2014.
Response to Examination Report dated Nov. 7, 2014 submitted in New Zealand Application No. 623986, dated Feb. 17, 2016.
Response to Feb. 6, 2007 Office Communication submitted in U.S. Appl. No. 11/269,899, dated Aug. 6, 2007.
Response to Invitation to Proceed for European Paten Application No. 11184942.8 filed Sep. 6, 2012.
Response to Invitation to Proceed for European Patent Application No. 11186249.6 filed Sep. 21, 2012.
Response to Invitation to Proceed issued in European Patent Application No. 11872538 dated Jun. 10, 2016, dated Dec. 19, 2016.
Response dated Jul. 2, 2009 Office Action submitted in U.S. Appl. No. 11/490,881, dated Sep. 24, 2009.
Response to Notice of Intent to Grant for European Patent Application No. 06788098.9 filed Sep. 2, 2013.
Response to Notice of Intention to Grant for European Patent Application No. 11186249.6 filed Feb. 17, 2015.

(56) References Cited

OTHER PUBLICATIONS

Response dated Nov. 19, 2007 Office Communication, U.S. Appl. No. 11/269,899, dated Dec. 19, 2008.
Response to Office Action dated Aug. 18, 2010 submitted in U.S. Appl. No. 11/874,130 dated Nov. 10, 2010.
Response to Office Action dated Aug. 2, 2013 submitted in U.S. Appl. No. 13/425,095, dated Feb. 3, 2014.
Response to Office Action dated Jan. 22, 2010 submitted in U.S. Appl. No. 11/874,130 dated May 24, 2010.
Response to Office Action dated Mar. 7, 2014 submitted in U.S. Appl. No. 13/425,095, dated Jun. 9, 2014.
Response to Office Action dated May 14, 2013 submitted in Canadian Application No. 2,616,287, dated Nov. 14, 2014.
Response to Office Action dated May 6, 2011 submitted in Mexican Patent Application No. MX/a/2008/001022, dated Sep. 5, 2011. (English summary provided at end).
Response to Office Action dated Nov. 13, 2015 submitted in U.S. Appl. No. 14/613,102, dated May 13, 2016.
Response to Office Action dated Oct. 16, 2012 submitted in U.S. Appl. No. 13/425,095, dated Apr. 16, 2013.
Response to Office Action for European Patent Application No. 11184942.8 filed Mar. 30, 2016.
Response to Office Action for European Patent Application No. 11184942.8 filed Nov. 6, 2013.
Response to Office Action for European Patent Application No. 11184942.8 filed Jan. 28, 2015.
Response to Office Action for European Patent Application No. 11186249.6 filed Dec. 2, 2013.
Response to Office Action issued in Canadian Application No. 2,849,723 dated Jul. 31, 2017, dated Jan. 31, 2019.
Response to Office Action issued in Mexican Application No. MX/a/2014/003490, dated Oct. 9, 2017, dated Feb. 26, 2018 (partial translation/explanation included).
Response to Office Action issued in Mexican Application No. MX/a/2014/003490, dated May 15, 2018, dated Oct. 1, 2018 (partial translation/explanation included).
Response to Office Action issued in Mexican Application No. MX/a/2014/003490, dated Oct. 15, 2018, submitted May 27, 2019 (partial translation/explanation included).
Response to Office Action issued in U.S. Appl. No. 90/013,980 dated Nov. 22, 2017, dated Jan. 22, 2018.
Response to Office Action issued U.S. Appl. No. 90/013,980, dated Feb. 8, 2018, dated Apr. 9, 2018.
Response to Office Action submitted in European App. No. 06792905.9, dated Oct. 30, 2009.
Response to Office Action submitted in European App. No. 19159342.5, dated May 6, 2020.
Response to Office Action, in European App. No. 06792907.5, dated Aug. 27, 2009.
Response to Office Communication for European Patent Application No. 06788098.9 filed Aug. 20, 2012.
Response to Office Communication for U.S. Appl. No. 10/245,158, filed Jan. 7, 2004.
Response to Office Communication for U.S. Appl. No. 10/173,172, filed Dec. 30, 2003.
Response to Office Communication for U.S. Appl. No. 12/097,875, filed Oct. 11, 2011.
Response to Office Communication for U.S. Appl. No. 13/449,174, filed Jun. 12, 2013.
Response to Office Communication for U.S. Appl. No. 12/097,872, filed Feb. 26, 2014.
Response to Office Communication for U.S. Appl. No. 12/097,872, filed Jul. 29, 2014.
Response to Office Communication issued in European Patent Application No. 06792907.5 filed Feb. 15, 2011.
Response to Office Communication submitted in European Patent Application No. 06788098.9, dated Jul. 30, 2010.
Response to Office Communication submitted in U.S. Appl. No. 11/269,899, dated Nov. 8, 2010.
Response to Office Communication submitted in U.S. Appl. No. 11/490,881, dated Jul. 22, 2010.
Response to Office Communication submitted in U.S. Appl. No. 11/490,881, dated Apr. 13, 2009.
Response to PCT Written Opinion for International Application No. PCT/US02/19128 filed Apr. 16, 2003.
Response to Rule 161(1) EPC issued in European Application No. 11872538 issued Jun. 6, 2014, submitted Dec. 10, 2014.
Response to Supplementary PCT Written Opinion for International Application No. PCT/US02/19128 filed Jul. 24, 2003.
Rodgers, et al. "Hydrostatic transmissions are evolving" Hydraulics & Pneumatics, Oct. 6, 2005, filed under Case No. IPR2016-00194 for U.S. Pat. No. 8,011,458 and under Case No. IPR2016-00219 for U.S. Pat. No. 8,136,613 and under Case No. IPR2016-01352 for U.S. Pat. No. 9,254,865 as Exhibit 1011 (downloaded Nov. 11, 2015—source URL: http://hydraulicspneumatics.com/200/TechZone/HydraulicPumpsM/Article/False/11799/TechZone-HydraulicPumpsM).
Select Pages from Alfred del Vecchio, *Dictionary of Medical Engineering*, New York: Philosophical Library, Inc, 1961, 157; 310, filed Nov. 28, 2016 in Case No. IPR2016-00219 for U.S. Pat. No. 8,136,613 as Exhibit 1028.
Select Pages from *Webster's Collegiate Dictionary*, $5^{th}$ ed., Springfield, Mass.: G&C Merriam Co., 1944, 480; 1114-1115, filed Nov. 28, 2016 in Case No. IPR2016-00219 for U.S. Pat. No. 8,136,613 as Exhibit 1029.
Shigley, Joseph E. and John J. Uicker, Jr., *Theory of Machines and Mechanisms*, New York: McGraw-Hill, 1980, 4-5; 10-11 filed Aug. 29, 2016 in Case No. IPR2016-00219 for U.S. Pat. No. 8,136,613 as Exhibit 2018.
Suh, C. H. and C. W. Radcliffe, *Kinematics and Mechanisms Design*, New York: John Wiley & Sons, 1978, 1-2, filed Aug. 29, 2016 in Case No. IPR2016-00219 for U.S. Pat. No. 8,136,613 as Exhibit 2035.
Summons to Attend Oral Proceedings for European Patent Application No. 06788098.9 issued Jan. 17, 2013.
Summons to Attend Oral Proceedings for European Patent Application No. 11186249.6 issued Apr. 14, 2014.
Supplemental Declaration of Fred P. Smith filed Nov. 28, 2016 under Case No. IPR2016-00194 for U.S. Pat. No. 8,011,458 as Exhibit 1030.
Supplemental Declaration of Fred P. Smith filed Nov. 28, 2016 in Case No. IPR2016-00219 for U.S. Pat. No. 8,136,613 as Exhibit 1025.
Supplemental Notice of Intention to Grant for European Patent Application No. 11186249.6 dated May 22, 2015.
Supplemental Response to Notice of Intention to Grant for European Patent Application No. 11186249.6 filed Apr. 28, 2015.
Supplementary European Search Report, issued in Application No. 06788098, dated Jul. 14, 2009.
Supplementary Notice of Intention to Grant for European Patent Application No. 06788098.9 dated Oct. 25, 2013.
Supplementary PCT Written Opinion for International Application No. PCT/US02/19128 dated Jun. 24, 2003.
Weimer, Jon, *Handbook of Ergonomic and Human Factors Tables*, New Jersey: Prentice Hall, 1993, 003-004, filed Nov. 28, 2016 in Case No. IPR2016-00219 for U.S. Pat. No. 8,136,613 as Exhibit 1038.
Wilson, Charles E. and J. Peter Sadler, *Kinematics and Dynamics of Machinery*, New Jersey: Pearson Education, 2003, 12-14 filed Aug. 29, 2016 in Case No. IPR2016-00219 for U.S. Pat. No. 8,136,613 as Exhibit 2021.
Wolfe, W. A., "Analytical Design of an Ackermann Steering Linkage," *Journal of Engineering for Industry: Transactions of the ASME*, Series B, vol. 81, No. 1, 1959, 10-14, filed Oct. 31, 2016 in Case No. IPR2016-01352 for U.S. Pat. No. 9,254,865 as Exhibit 2009.
Wong, J. Y. *Theory of Ground Vehicles*, John Wiley & Sons: 2001, 335-342, filed Oct. 31, 2016 in Case No. IPR2016-01352 for U.S. Pat. No. 9,254,865 as Exhibit 2006.
Written Response to Summons to Attend Oral Proceeding for European Patent Application No. 06788098.9 filed Mar. 15, 2013.

(56) References Cited

OTHER PUBLICATIONS

Written Response to Summons to Attend Oral Proceedings for European Patent Application No. 11186249.6 filed Sep. 26, 2014.
Appeal Brief from the United States Patent and Trademark Office, Originating Case No. 90/013,980, filed Apr. 9, 2021, in the United States Court of Appeals for the Federal Circuit, Case: 21-1474, In re: MTD Products Inc.
Brief for Appellee (USPTO), Originating Case No. 90/013,980, filed Jun. 16, 2021, in the United States Court of Appeals for the Federal Circuit, Case: 21-1474, In re: MTD Products Inc.
Extended European search report dated Oct. 2, 2019 for European App. No. 19159342.5 (10 pages).
Article 94(3) EPC communication dated Sep. 17, 2021 for European App. No. 19159342.5 (5 pages).
Response to Article 94(3) EPC communication, dated Jan. 7, 2022 for European App. No. 19159342.5 (12 pages).
Rule 71(3) EPC intention to grant dated Apr. 20, 2022 for European App. No. 19159342.5 (7 pages).

\* cited by examiner

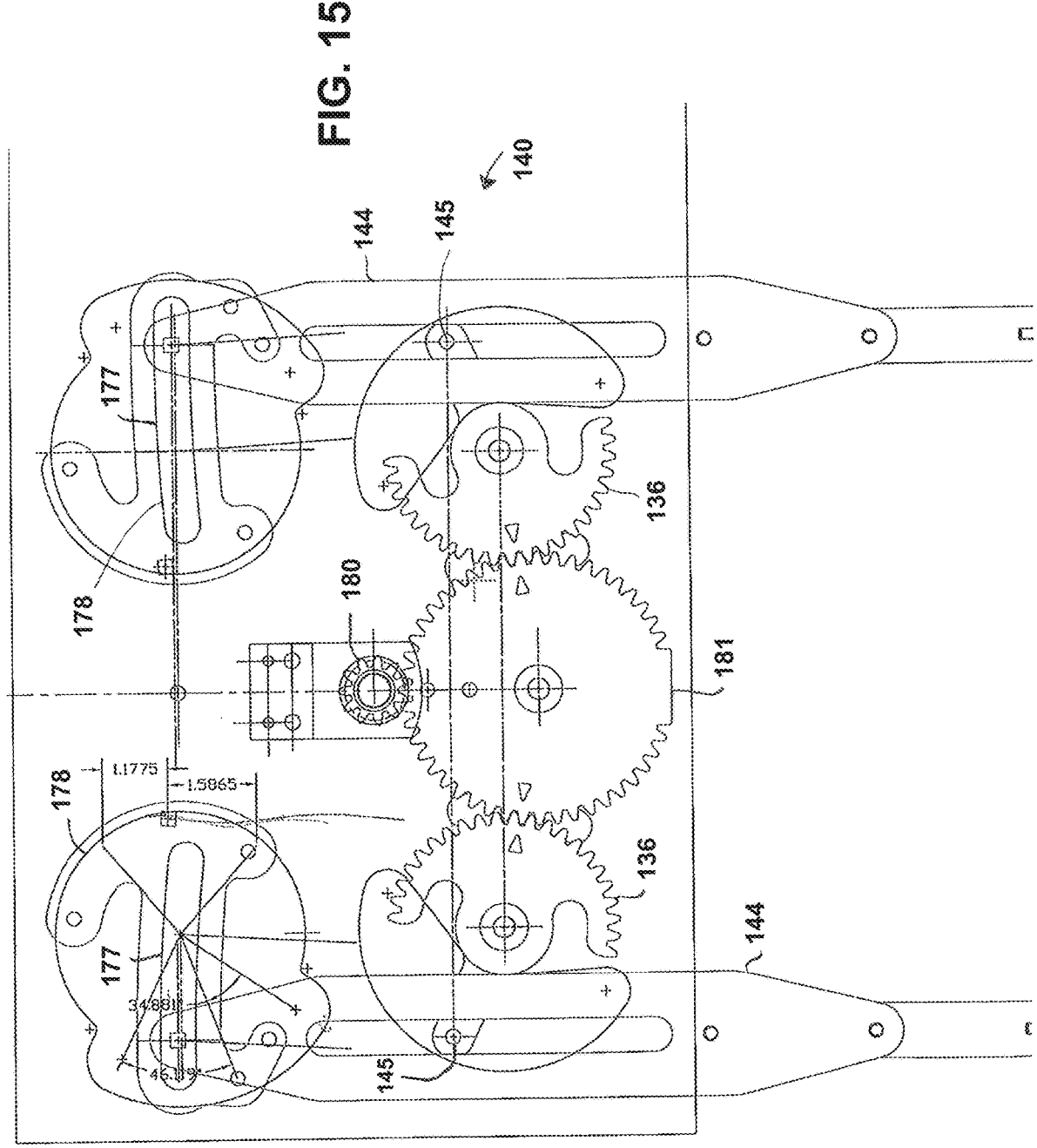

VEHICLE CONTROL SYSTEMS AND METHODS AND RELATED VEHICLES

CROSS-REFERENCE TO RELATED APPLICATIONS

This application is a continuation of U.S. patent application Ser. No. 14/346,690, filed Aug. 25, 2014, a national phase application under 35 U.S.C. § 371 of International Application No. PCT/US2011/052845, filed Sep. 22, 2011, both of which are specifically incorporated by reference without disclaimer.

BACKGROUND

Embodiments of the invention relate generally to vehicles that have low to zero turning radius capability. In the art, zero turning radius vehicles are often described as ZTR vehicles, although this name has also been used to described vehicles capable of a turning radius that is not precisely zero. More specifically, embodiments of the invention relate to steering systems for such vehicles, to steering and speed coordination systems for such vehicles, to vehicles that comprises one or both types of systems, and to methods of coordinating steering and speed inputs in operating a vehicle.

SUMMARY

In one respect, the invention is a vehicle control system, embodiments of which comprise a first flexible member configured to be coupled to a first steering input member; a control member operatively engaged with the first flexible member; and a first integration link coupled to the control member and configured to be coupled to a first drive unit. The control member may comprise gear teeth. The control member may be a rigid structure. The control member may be operatively engaged with the first flexible member such that movement of the first flexible member results in movement of the control member. The first integration link may be a rigid structure and may pivot laterally as a result of movement of the control member, which may be rotational movement. The vehicle control system may have a second flexible member configured to be coupled to a second steering input member, and a second integration link coupled to the control member and configured to be coupled to a second drive unit. The vehicle control system may have first and second integration members coupling the control member to the first and second integration links, respectively. The vehicle control system may have first and second speed input members responsive to movement of a speed input device, such as a pedal, and coupled to the first and second integration links, respectively, such that movement of the speed input device will cause forward or rearward movement of the links.

In another respect, the invention is a vehicle control system, embodiments of which comprise a first steering system for a first steerable wheel, wherein the first steering system comprises a first steering input member configured to be coupled to a steering input device; a control member configured to receive a steering input from the first steering input member; and a first integration link coupled to the control member and configured to be coupled to a first drive unit. The first control member may be a rigid structure and may rotate as a result of receiving the steering input. The first steering member may be a geared member that moves as a result of movement of a rack-and-pinion assembly coupled to a steering input device, such as a steering wheel. The first integration link may be a rigid structure and may pivot laterally as a result of movement of the control member. The vehicle control system may have a second integration link coupled to the control member and configured to be coupled to a second drive unit. The vehicle control system may have first and second integration members coupling the control member to the first and second integration links, respectively. The vehicle control system may have first and second speed input members responsive to movement of a speed input device, such as a pedal, and coupled to the first and second integration links, respectively, such that movement of the speed input device will cause forward or rearward movement of the links.

In another respect, the invention is a vehicle control system, embodiments of which comprise a control member that will move as a result of movement of a steering input device; a first integration link coupled to the control member and configured to be coupled to a first drive unit; and a first integration member coupled to the first integration link such that rotational movement of the control member will cause movement of the first integration member, which will cause movement of the first integration link. In some embodiments, the first integration member is not attached to a rigid link that extends forward of the control member. In some embodiments, the vehicle control system is configured so as to not send a steering signal forward of the control member. The vehicle control system may have a second integration link coupled to the control member and configured to be coupled to a second drive unit. The first and second integration links may be rigid and may have each have a slot that is substantially straight along at least the majority or all of its length. The vehicle control system may also have second integration member operatively engaged with the control member and coupled to the second integration link such that rotational movement of the control member will cause movement of the second integration member, which will cause movement of the second integration link. The vehicle control system may have first and second speed input members responsive to movement of a speed input device, such as a pedal, and coupled to the first and second integration links, respectively, such that movement of the speed input device will cause forward or rearward movement of the links.

In another respect, the invention is a vehicle control system, embodiments of which comprise a gear that will rotate in response to movement of a steering input device; a control member operatively engaged with the gear and configured to rotate as a result of rotation of the gear; a first integration link coupled to the control member and configured to be coupled to a first drive unit; and a first integration member operatively engaged with the control member and coupled to the first integration link such that rotational movement of the control member will cause movement of the first integration member, which will cause movement of the first integration link. The vehicle control system may have a second integration link coupled to the control member and configured to be coupled to a second drive unit. The first and second integration links may be rigid and may have each have a slot that is substantially straight along at least the majority or all of its length. The vehicle control system may also have second integration member operatively engaged with the control member and coupled to the second integration link such that rotational movement of the control member will cause movement of the second integration member, which will cause movement of the second integration link. The vehicle control system may have first and second speed input members responsive to movement of a speed input device, such as a pedal, and coupled to the first and second integration links, respectively, such that movement of the speed input device will cause forward or rearward movement of the links.

Embodiments of the present vehicle control systems, including those illustrated in the figures below, are configured to reduce the speed of the vehicle of which it is a part (specifically the outboard drive wheel) when it enters a sufficiently extreme turn (e.g., one in which a steerable wheel of the vehicle (such as one engaging the ground through a tire) can be turned no further) under a constant speed input. Embodiments of the present vehicle control systems, including those illustrated in the figures below, are configured to provide correct steering of the vehicle of which it is a part in forward and reverse for a given steering input (meaning the vehicle will follow the same arc for a given turn in forward as it will in reverse).

In another respect, the invention is a vehicle that includes any of the present vehicle control systems.

In another respect, the invention is a method of integrating a steering input with a speed input in operating a vehicle, where the method comprises: receiving a steering input from a steered wheel that is configured to engage the ground (such as through a tire); positioning a follower along a cam of a speed input member as a result of the receiving; moving the speed input member by manipulating a speed input device (such as a pedal); and moving an integration link coupled to the follower as a result of moving the speed input member. The cam may be a slot and the follower may be a coupling member, and the method may involve a second speed input member with a second cam and a second integration link coupled to a second follower that can be positioned along the second cam.

In another respect, the invention is a method of integrating a steering input with a speed input in operating a vehicle, where the method comprises: receiving a steering input from a steering input device (such as a steering wheel); positioning a follower along a cam of a speed input member as a result of the receiving; moving the speed input member by manipulating a speed input device (such as a pedal); and moving an integration link coupled to the follower as a result of moving the speed input member. In some embodiments, a steering signal is not sent forward of a control member that is coupled to the integration link. The cam may be a slot and the follower may be a coupling member, and the method may involve a second speed input member with a second cam and a second integration link coupled to a second follower that can be positioned along the second cam.

Any embodiment of any of the present systems, devices, and methods may consist of or consist essentially of—rather than comprise/include/contain/have—the described features or steps. Thus, in any of the claims, the term "consisting of" or "consisting essentially of" may be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with these embodiments and others are provided below.

BRIEF DESCRIPTION OF THE DRAWINGS

The following drawings illustrate by way of example and not limitation. Identical reference numerals do not necessarily indicate an identical structure. Rather, the same reference numeral may be used to indicate a similar feature or a feature with similar functionality. Every feature of each embodiment is not always labeled in every figure in which that embodiment appears, in order to keep the figures clear. The embodiments of the present devices and systems (and their components) shown in FIGS. 1-15 are drawn to scale.

FIG. 15 illustrates a partial top view of another embodiment of one of the present control assemblies.

DETAILED DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. Thus, a vehicle that "comprises" a steering input member; a first control member operatively engaged with the steering input member; a first steering link coupled to the first control member and to a steering system for a first steered wheel; and a first integration link coupled to the first control member and to a control system for a first drive unit, is a vehicle that possesses the listed elements, but is not prohibited from possessing elements that are not listed (such as a steerable structure).

Likewise, an element of a device or apparatus that "comprises," "has," "contains" or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The term "coupled" is defined as connected, although not necessarily directly, and not necessarily mechanically. The term "substantially" and its variations (e.g. "approximately" and "about") are defined as being largely but not necessarily wholly what is specified (and include wholly what is specified) as understood by one of ordinary skill in the art. In any disclosed embodiment, the terms "substantially," "approximately," and "about" may be substituted with "within [a percentage] of" what is specified, where the percentage includes 0.1, 1, 5, and 10 percent.

General Configuration

Figure 1:
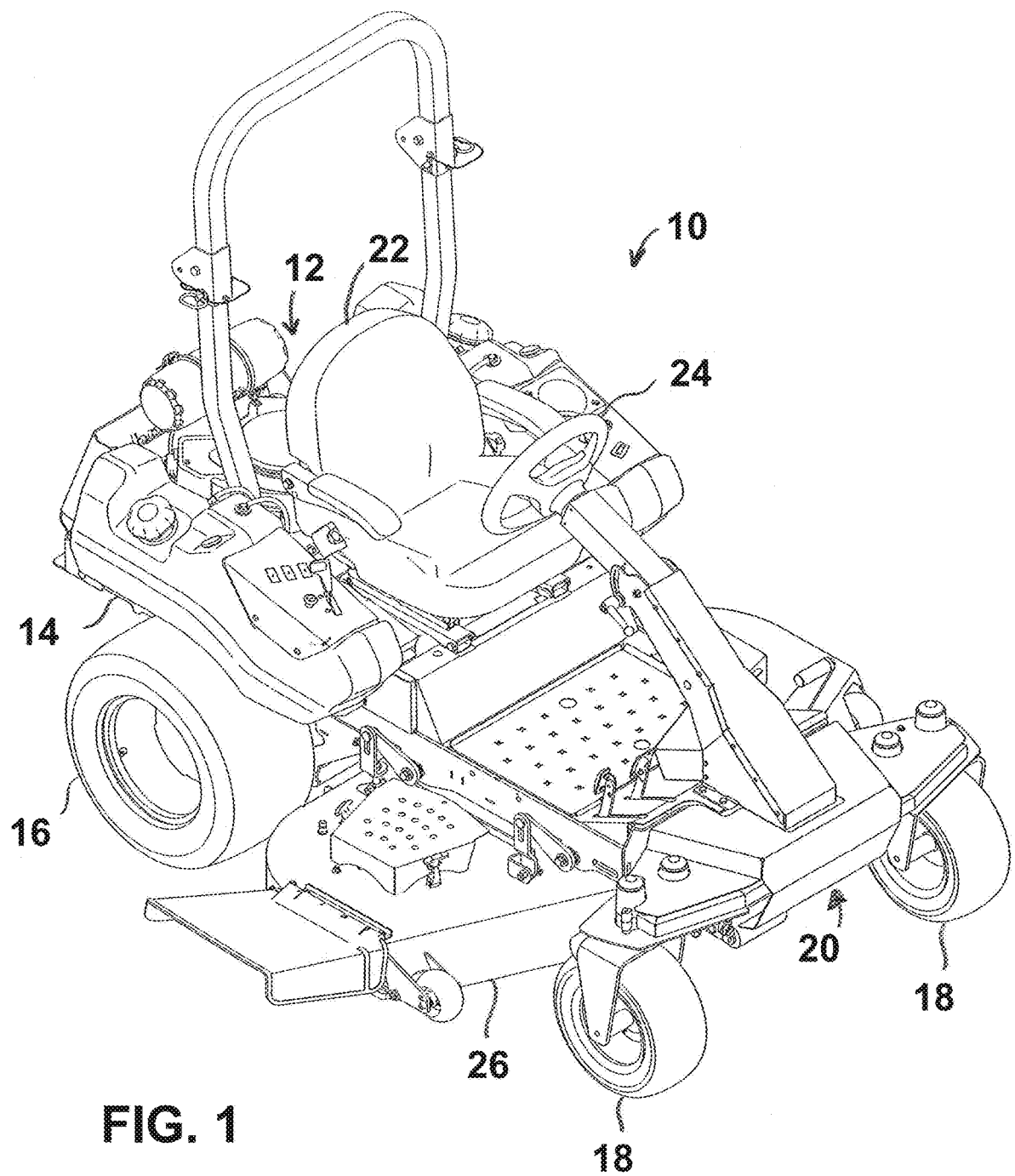
FIG. 1 is a perspective view of a lawn and garden type vehicle.
Figure 2:
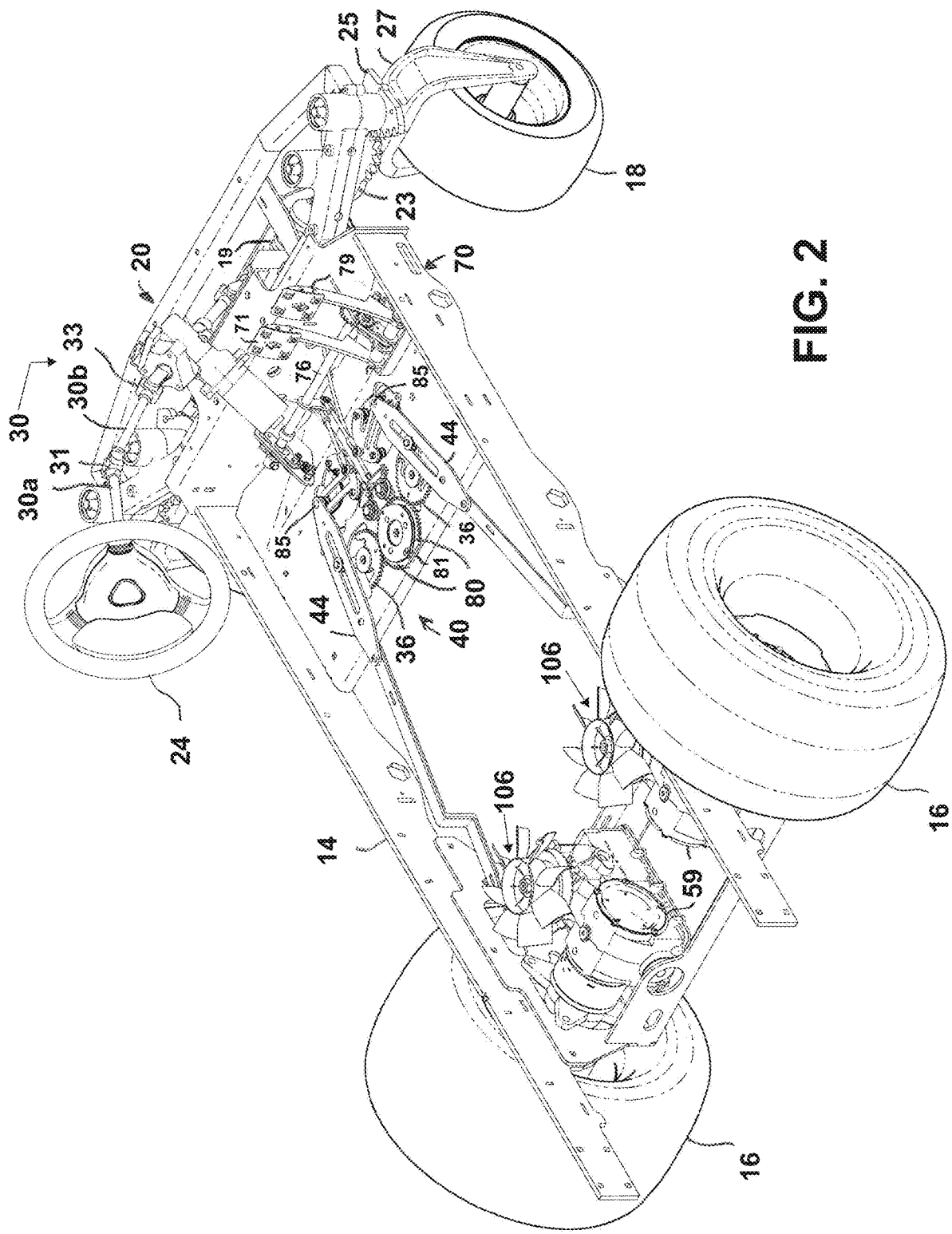
FIG. 2 is a perspective view of the chassis and vehicle control assemblies of the vehicle of FIG. 1.

Referring now to the figures, FIG. 1 illustrates a vehicle 10, such as a lawn and garden tractor. The vehicle 10 includes a prime mover 12, such as an engine, that is mounted to a structural frame or frame 14. The vehicle 10 includes drive wheels 16, such as left and right rear drive wheels that are coupled to the frame 14. The drive wheels 16 are coupled to the engine 12 through a transmission system to provide locomotion to the vehicle 10. The vehicle 10 also has steerable structures 18, such as right and left front wheels, which may be non-driving wheels. Other embodiments of the vehicles have only one steerable structure (e.g., three-wheeled all-terrain vehicles). Furthermore, in some embodiments, steerable structures such as skis may be used instead of wheels.

The frame 14 supports an operator station comprising a seat 22. Vehicle 10 also includes a mower deck 26 mounted to the vehicle 10 in any suitable manner. In some embodiments, the invention is applicable to other types of vehicles, including but not limited to utility vehicles, off road vehicles, tractors, golf carts, and even automobiles.

Figure 5:
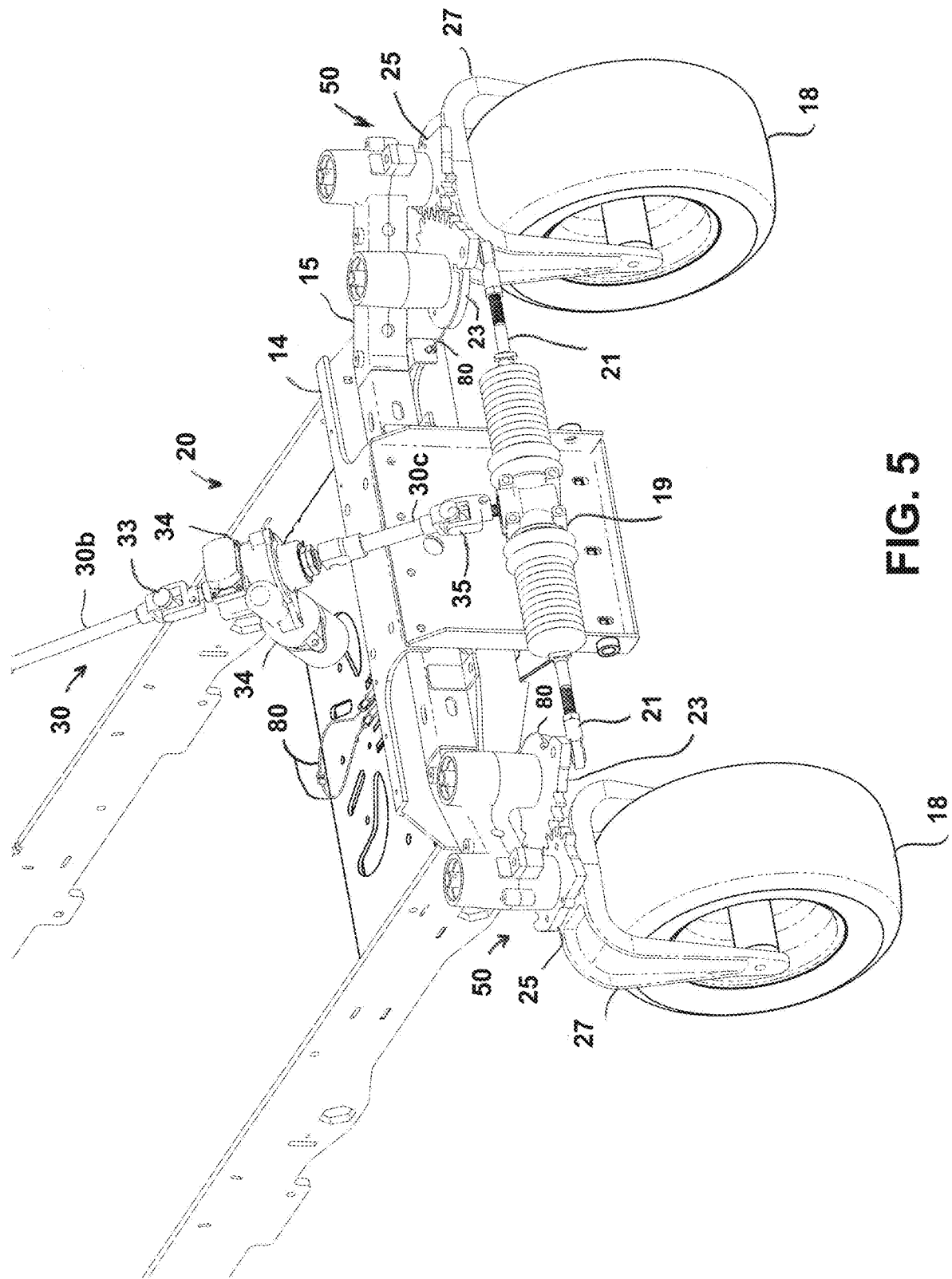
FIG. 5 is a partial perspective view of the steering assembly of the vehicle of FIG. 1.

As shown in FIG. 5, the front steerable wheels 18 are coupled to the frame of the vehicle through a rack and pinion assembly 19 coupled to (and, more specifically, mounted on) the frame 14. The steerable wheels 18 are also coupled to a steering assembly 20, which is configured to control the direction they turn as discussed more fully below. In the embodiment of the present vehicles shown in the figures, the front wheels are the steerable wheels 18 and the rear wheels are the drive wheels 16. However, one skilled in the art will understand that the rear wheels may be the steerable wheels and the front wheels may be the drive wheels in other embodiments. Likewise, the front wheels may be both steerable and drivable.

A steering input device 24 (which is part of the embodiment of the steering assembly 20 shown in the figures) and a speed control device 71 (which is part of the embodiment of the speed control assembly 70 discussed below) are located near the seat 22 (FIG. 1) so that they are accessible to the operator of the vehicle. An operator may apply a steering input to the steering input device 24, which transfers the steering input to the steering assembly 20. Steering input device 24 may take the form of a conventional steering wheel. However, the steering input device 24 may be another suitable steering device, including, but not limited to, a steering rod or joystick (not shown).

Speed control devices 71 and 79 provide a forward and reverse speed input, respectively, to the balance of the speed control assembly 70, and (at least in part) regulate the forward and reverse speed of the vehicle 10. In certain embodiments, speed control devices 71 and 79 may take the form of a single pedal, such as a treadle pedal arrangement mounted on a single shaft. In such an embodiment, the speed control device can be rocked forward to select forward drive, or rocked backward to select reverse drive. Speed control devices 71 and 79 may be biased toward a central position that corresponds to a neutral or stationary condition.

Vehicle 10 also includes a control system 40 that is configured to integrate a steering input received by the steering assembly 20 via the steering input device 24 with a speed input received by the speed control assembly 70 (discussed below) via the speed control devices 71 and 79 to drive and help steer the vehicle 10. The configurations of the present steering assemblies, speed control assemblies and integration devices allow the vehicle to make small- to zero-radius turns.

The left and right drive wheels 16 are driven through a transmission system that, in the depicted embodiment, comprises left and right drive units 59. Vehicle 10 includes a speed control assembly 70 that controls the direction and magnitude of rotation of the rear drive wheels 16. The drive units 59 may comprise hydrostatic transmissions (as shown) or electric motors, both of which are well known in the art. Each drive wheel 16 is mounted on a hub coupled to an output shaft of each drive unit 59. The drive units 59 may also be transmissions of the continuously variable type, capable of providing a continuous range of ratios from forward to reverse. Examples of a suitable transmission utilizing a ratio varying-device, or variation, in conjunction with an epicyclic shunt gear to provide a geared neutral facility is described in International Application PCT/GB03/00332, published under WO 03/064892, and International Application PCT/GB03/02332, published under WO 03/100295, both of which are incorporated by reference for those descriptions. The drive units 59 may be used to independently drive the drive wheels 16 at rates and directions that propel as well as help steer the vehicle.

The driver dictates the speed and direction of the vehicle 10 by manipulating steering input device 24 and speed control device 71, which transmit the steering and speed inputs received from the driver to control system 40, the operation of which is described in more detail below. In the embodiment of vehicle 10 shown in the figures, the amount of torque that the rear drive wheels must produce to turn the vehicle 10 is reduced because front wheels are steerable wheels 18. In contrast, the drive wheels 16 of some conventional ZTR vehicles with non-steerable castor wheels must produce significant torque to cause the castor wheels to react and point in the desired direction.

In the embodiment of vehicle 10 shown in the figures, the right and left drive wheels 16 are coupled to frame 14 such that their direction is fixed and their rotational axes are substantially in constant alignment. In contrast, the front steerable wheels 18 are coupled to the frame 14 in a way that gives them the ability to change direction. The use of a substantially-true Ackermann steering geometry (which can be achieved using some of the embodiments discussed below) can help to avoid scrubbing rubber from the tire tread on the outboard wheel or damaging vegetation under the front wheels.

Steering Assembly

Aspects of steering assembly 20 are depicted in, e.g., FIGS. 2 and 5-14. One function of the steering assembly 20 is to couple the steering input device 24 to the front steerable wheels 18 to aid in guiding vehicle 10. Another function of the steering assembly 20 is to provide a steering input from a steerable wheel 18 to the control system 40, which can coordinate that steering input with a speed input received through speed control device 71. Another function of the steering assembly 20 is its ability to turn the steerable wheels of the vehicle 10, even in a zero turning radius mode (or a small turning radius mode), while receiving an input from a conventional steering input device such as a steering wheel.

In one embodiment, the steering assembly 20 includes a steering shaft 30 coupled to steering input device 24 and rack and pinion assembly 19. Steering shaft 30 includes at least three segments in the depicted embodiment: 30a, which extends from steering input device 24 to a first u-joint 31; 30b, which extends from first u-joint 31 to second u-joint 33; and 30c, which is disposed between u-joint 33 and u-joint 35. U-joint 31 allows the angle of steering shaft segment 30a to be adjusted relative to steering shaft segment 30b, so as to best suit a given rider. Electric power assist assembly 34 is disposed between u-joints 33 and 35 and includes an electric motor (which receives power from a battery coupled to the vehicle (not shown)) that functions to help turn steering shaft segment 30c. The steering shaft 30 and rack and pinion assembly 19 take part in transmitting the steering input received through the steering input device 24 to front wheel assemblies 50, the operation of which is described in more detail below. In certain embodiments, front wheel assemblies 50 are configured to provide Ackermann steering so that the inner front wheel turns about a smaller radius than the outer front wheel.

Referring specifically to FIG. 5, in one embodiment, the coupling between the steering shaft 30 and the front wheel assemblies is accomplished using rack and pinion assembly 19, which includes links 21 coupled to steering input members 23, which in the depicted embodiment is a steering input gear. Steering input members 23 are engaged with steering gear members 25, which are coupled to wheel supports (yokes, in this embodiment) 27. As steering shaft 30 is rotated, links 21 are shifted laterally to rotate steering input members 23, which in turn cause wheel supports 27 and front steerable wheels 18 to turn. In this way, steering assembly 20 is configured to receive a rotational steering input and translate it into two separate linear outputs that are transmitted substantially laterally to two different steerable wheel assemblies (50, in this embodiment). The steering input member 23 and steering gear member 25 of a given front wheel assembly 50 are connected to the same structural member 15 of frame 14 such that their positions relative to each other are fixed.

In this embodiment, each steering input member 23 is coupled (and, in the depicted embodiment, directly connected) to a flexible member 80. In certain embodiments, each flexible member 80 is configured as a cable. In other embodiments, flexible members 80 may be configured as a belt, chain, or other suitable device. In certain embodiments, a single flexible member may be coupled to both steering input members 23. The rotation of steering input members 23 causes flexible members 80 to move, as will be discussed in more detail below.

Steering assembly 20 is configured such that rotation of the steering input device 24 and steering shaft 30 causes rotation (and more specifically, taking into account manufacturing tolerances and play in the u-joints, near-simultaneous rotation) of front steerable wheels 18. In certain exemplary embodiments, the steering input device 24 and steering shaft 30 may be rotated through about 120 degrees of movement. For example, the steering input device 24 may be selectively rotated 60 degrees in a first direction with respect to a neutral (straight-ahead) steering position and 60 degrees in a second direction. However, the steering input device 24 and steering shaft 30 may be configured for rotation through any range of angles suited to a given application.

Speed Control Assembly

Referring now to FIGS. 1-4, speed control assembly 70 comprises speed control devices 71 and 79. In this embodiment speed control device 71 is configured to control the forward speed of vehicle 10, while speed control device 79 is configured to control the rearward speed of vehicle 10. It is understood that in other embodiments, a single speed control device can be utilized to control both forward and rearward speed of vehicle 10. While the effects of manipulating speed control device 71 will primarily be discussed, it is understood that the manipulation of speed control device 79 will have similar but opposite effects on control system 40 and vehicle 10 (e.g., a reverse speed input rather than a forward speed input).

Speed control device 71 is coupled to shaft 76 such that when speed control device 71 is pressed forward, shaft 76 rotates counter-clockwise (when viewed from the end of shaft 76 nearest speed control device 71). As shaft 76 rotates counter-clockwise, coupling members 75 are moved toward the front of vehicle 10 (e.g., away from drive units 59). Coupling members 75 are, in the depicted embodiment, rigid links (e.g., rods) that are coupled to a pair of speed input members 78, which each comprise a slot 77. As coupling members 75 are shifted forward, speed input members 78 are rotated such that the inner ends 49 of slots 77 are shifted toward the front of the vehicle 10 (e.g., when viewed from above, the right speed input member 78 rotates clockwise and the left speed input member 78 rotates counter-clockwise).

As previously discussed, flexible members 80 move as a result of a steering input being provided through steering input device 24. Flexible members 80 are coupled (and, in the depicted embodiment, directly connected) to a control member 81 such that movement of flexible members 80 causes rotation of control member 81. For example, when steering input device 24 is rotated clockwise (when viewed from above) to effect a right turn, flexible members 80 will cause control member 81 to rotate counter-clockwise (when viewed from above). In the depicted embodiment, control member 81 comprises a geared structure having teeth that are substantially equidistant from the rotational axis of the control member, and that surround at least 50 percent (more specifically, at least 75 percent, and even more specifically at least 90 percent) of the control member. Control member 81 includes a flexible member connector plate 83a (which has an at least partially circular shape) that is attached to a geared plate 83b and to which flexible members 80 are directly connected. In this way, the positions of the flexible members do not impair the contact between control member 81 and integration members 36, discussed in more detail below.

Control member 81 is engaged with at least one integration member that is a rigid structure configured to affect the position of the integration links relative to the speed input members and that in this embodiment comprises two integration members 36 such that rotation of control member 81 also causes rotation of integration members 36. Therefore, as steering input device 24 is rotated to initiate a turn, integration members 36 also rotate. Integration members 36 are coupled to integration links 44 via coupling members 45 such that rotation of integration members 36 moves integration links 44 such that the integration links pivot laterally about the point of connection between drive links 104 (to which the integration links are coupled) and control mechanisms 106 for drive units 59. Although not highlighted in the figures, a sealed ball bearing may be used to connect each drive link to a respective control mechanism. In the depicted embodiment, integration members 36 comprise geared structures having teeth that are substantially equidistant from the rotational axis of the respective integration member, and that surround at least approximately 50 percent of the respective integration member. In the depicted embodiment, the turning radius of geared plate 83b (or, more generally, of control member 81) is greater than the turning radii of integration members 36.

In the depicted embodiment, control member 81 and integration members 36 are rotatable in one of more parallel planes. In addition, integration links 44 and speed input members 78 can laterally pivot in the (same) one or more parallel planes. In the embodiment shown, speed input members 78 comprise a plurality of rollers 98 configured to follow respective openings 99 in panel 97. Openings 99 may have a curved shape, and the shape may be comprised of differently-shaped curved segments. Each roller 98 may include a sealed ball bearing (not shown).

In certain embodiments, integration links 44 are coupled to integration members 36 via coupling members 45 (which may be characterized as followers) that engage the slots 43 (which may be characterized as cams or cam slots) in integration links 44. In certain embodiments, slots 43 are straight along substantially their entire length. In some embodiments, a given coupling member 45 is attached to (e.g., bolted to, threaded into, welded to) or even integral with integration member 36 and couples (more specifically, directly connects) integration member 36 to integration link 44 by extending vertically through slot 43 of integration link 44. Coupling members 45 may include bolts or pins with threaded ends that may be coupled to integration links 44 via a threaded coupling.

In the depicted embodiment, coupling members 45 are coupled to integration members 36 so that as integration members 36 rotate, coupling members 45 move in an arc, which movement includes both a forward or a backward component (towards the front or back of vehicle 10) and a lateral component (towards one side of vehicle 10). As a result, coupling members 45 can slide forward or back within slots 43 and can also cause integration links 44 to pivot laterally (as discussed above) by exerting a force on the side of slots 43.

Integration links 44 are also coupled to speed input members 78 via speed input coupling members 85 (which may be characterized as followers). In one embodiment, speed input coupling members 85 are pins that extend vertically from integration links 44 and through speed input members 78.

Figure 6:
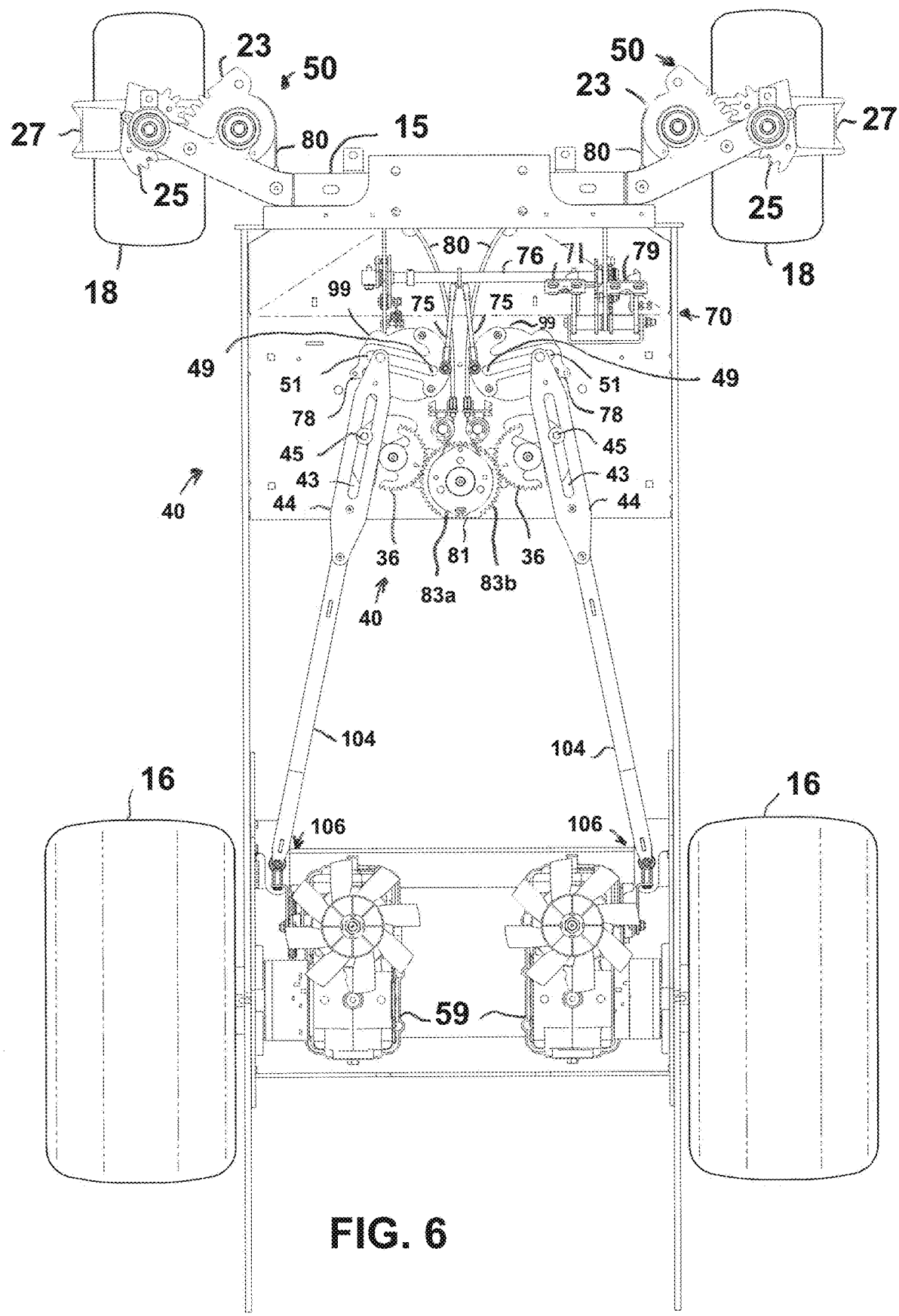
FIG. 6 illustrates a top view of the control and steering assemblies of the vehicle of FIG. 1 with a neutral steering input and a neutral speed input.
Figure 7:
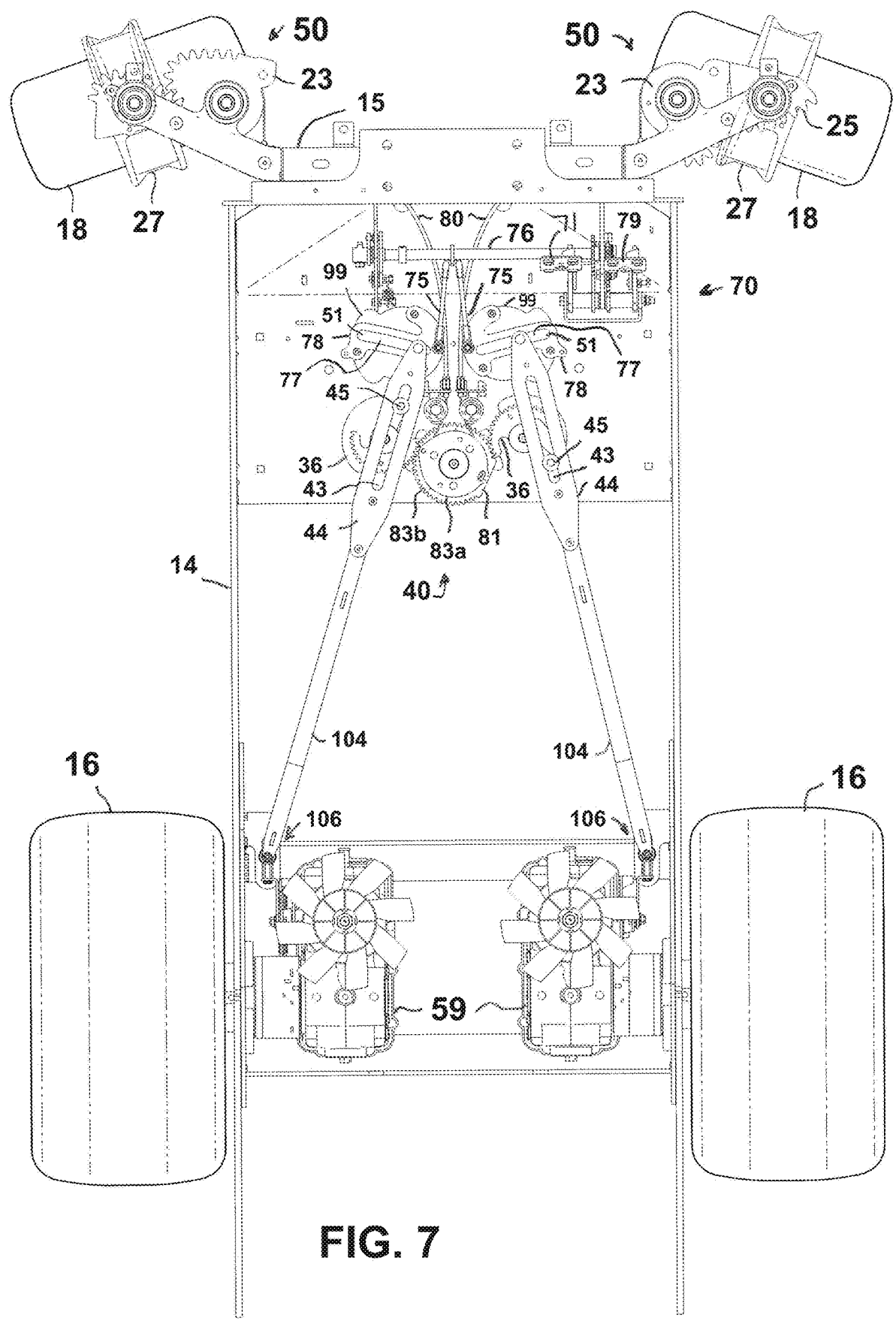
FIG. 7 illustrates a top view of the control and steering assemblies of the vehicle of FIG. 1 with a left turn steering input and a neutral speed input.
Figure 8:
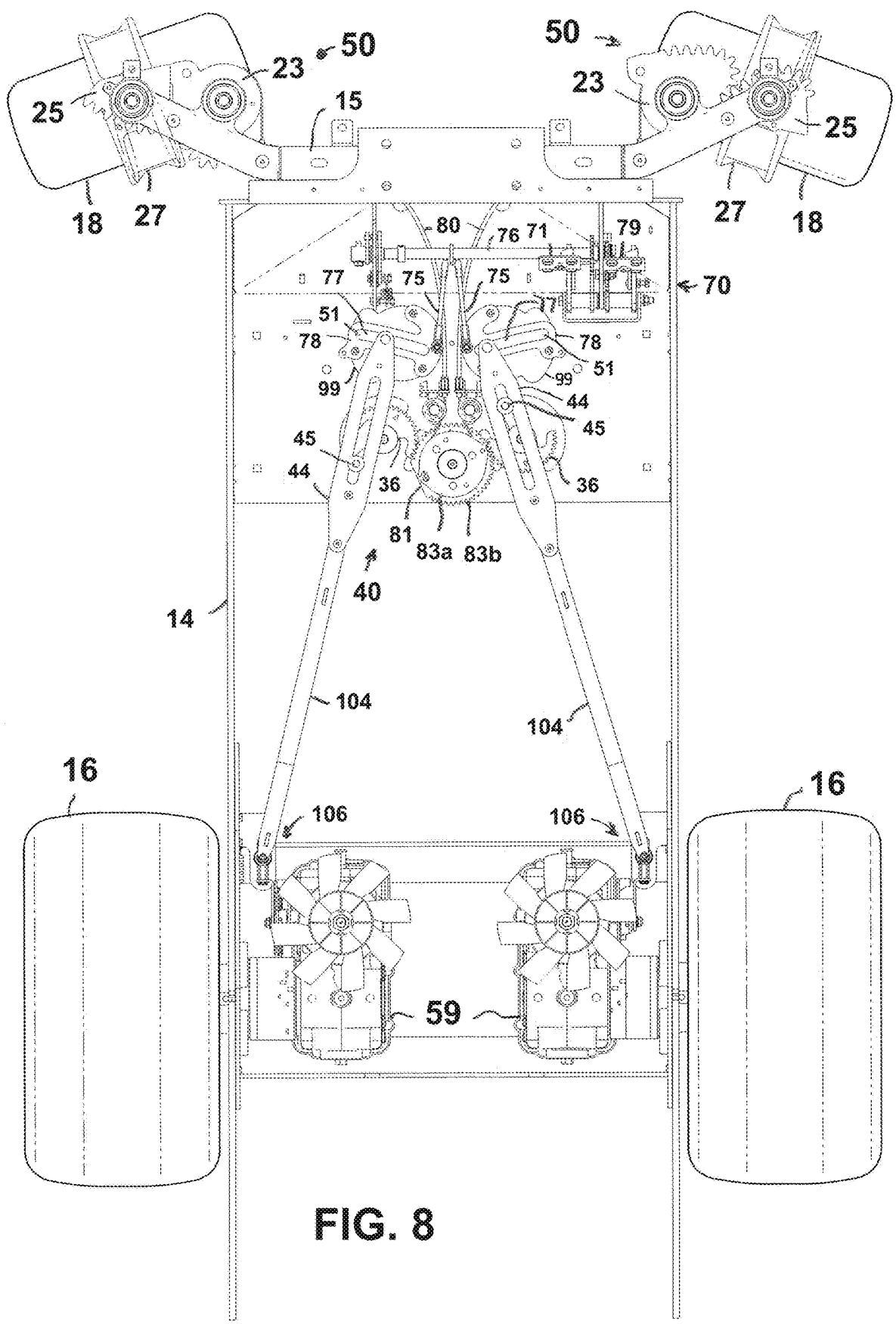
FIG. 8 illustrates a top view of the control and steering assemblies of the vehicle of FIG. 1 with a right turn steering input and a neutral speed input.

Coupling members 45 act on right and left integration links 44, which are laterally pivoted and, through speed input coupling members 85, engage slots 77 (which may also be characterized as cams or cam slots) of speed input members 78 in different locations within slots 77. For example, when steering input device 24 is placed in a neutral position as shown in FIG. 6, integration links 44 are arranged so that they are proximate to the outer ends 51 of slots 77. However, as steering input device 24 is turned to the left as shown in FIG. 7, left integration link 44 (and speed input coupling member 85) is moved proximate to inner end 49 of slot 77, while right integration link 44 is moved generally sideways (or, more specifically, pivoted laterally counter-clockwise) toward inner end 49 to a lesser degree. Similarly, when steering input device 24 is turned to the right, as shown in FIG. 8, right integration link 44 is moved proximate to inner end 49 of slot 77, while left integration link 44 is moved generally sideways (or, more specifically, pivoted laterally clockwise) toward inner end 49 to a lesser degree.

As discussed more fully below, the manipulation of speed control device 71, along with steering input device 24, affects the rotational speed and direction of rotation of drive wheels 16.

Control System

Embodiments of the present vehicle control systems, including those illustrated in the figures, are configured to reduce the speed of the outboard drive wheel during a sufficiently extreme turn under a constant speed input. Embodiments of the present vehicle control systems, including those illustrated in the figures, are configured to provide correct steering of the vehicle of which it is a part in forward and reverse for a given steering input. These configurations may be achieved using, for example, the embodiments of control system 40 shown and described in this disclosure, including, in at least some embodiments, through the operation of the control member, the integration members, the integration links, and the speed input members.

FIGS. 6-8 illustrate views of control system 40 in a neutral speed position for speed control devices 71 and 79 and with different steering inputs from steering input device 24. With speed control devices 71 and 79 in a neutral speed position, control system 40 is configured so that manipulation of steering input device 24 does not cause right or left integration link 44 to be shifted towards the front or rear of vehicle 10. For example, each slot 77 of the speed input members 78 is slightly curved at a radius equivalent to the combined effective length of integration link 44 and a drive link 104 (the distance between slot 47 and the connection point where drive link 104 connects to drive unit 59). Therefore, right and left drive units 59 will not be manipulated to cause rotation of either drive wheel 16 based on a steering input alone. The relationship between the position of integration links 44 and the output of drive units 59 is discussed more fully below.

Figure 3:
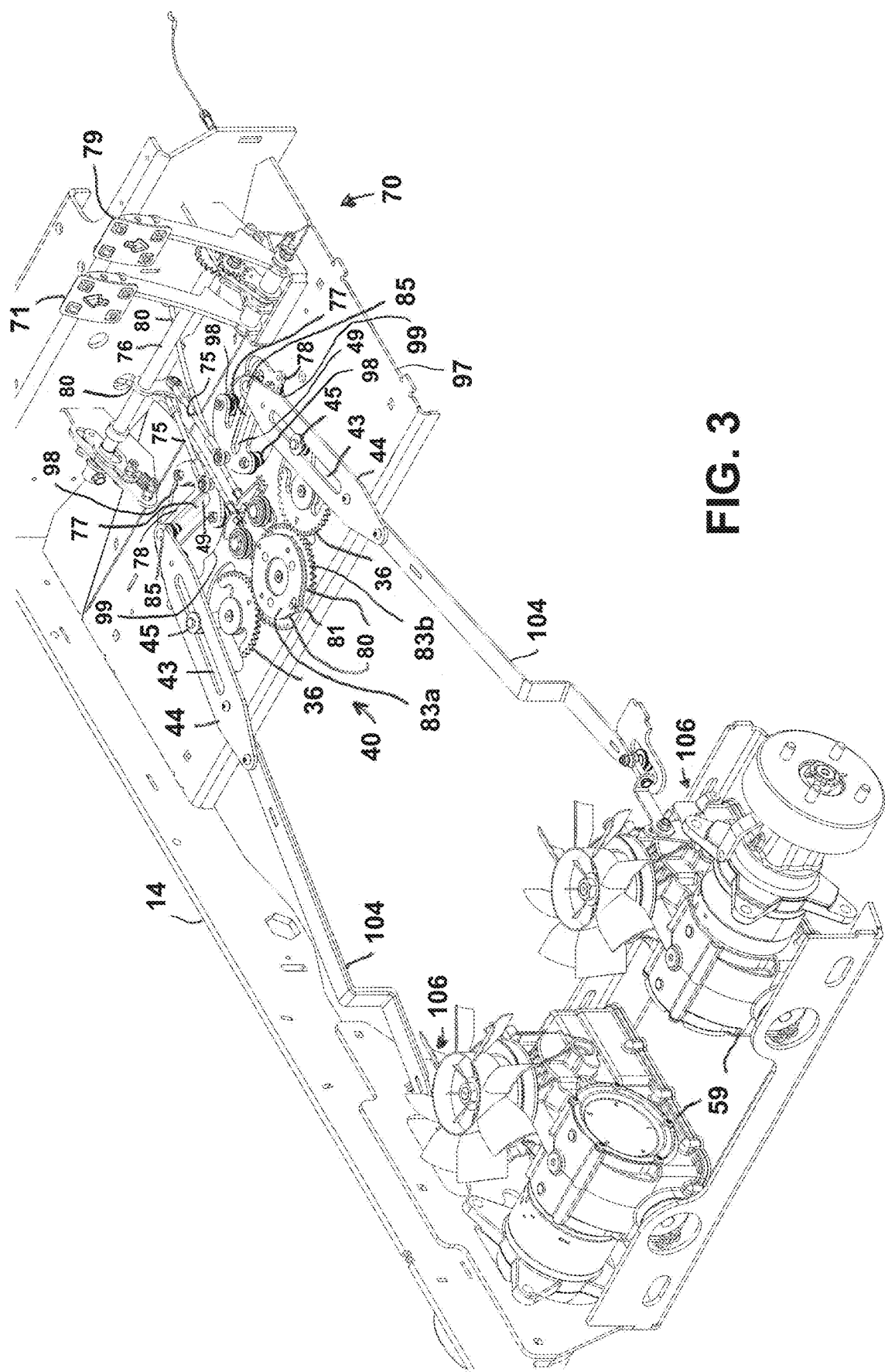
FIG. 3 is a partial perspective view of the control assembly of the vehicle of FIG. 1.
Figure 4:
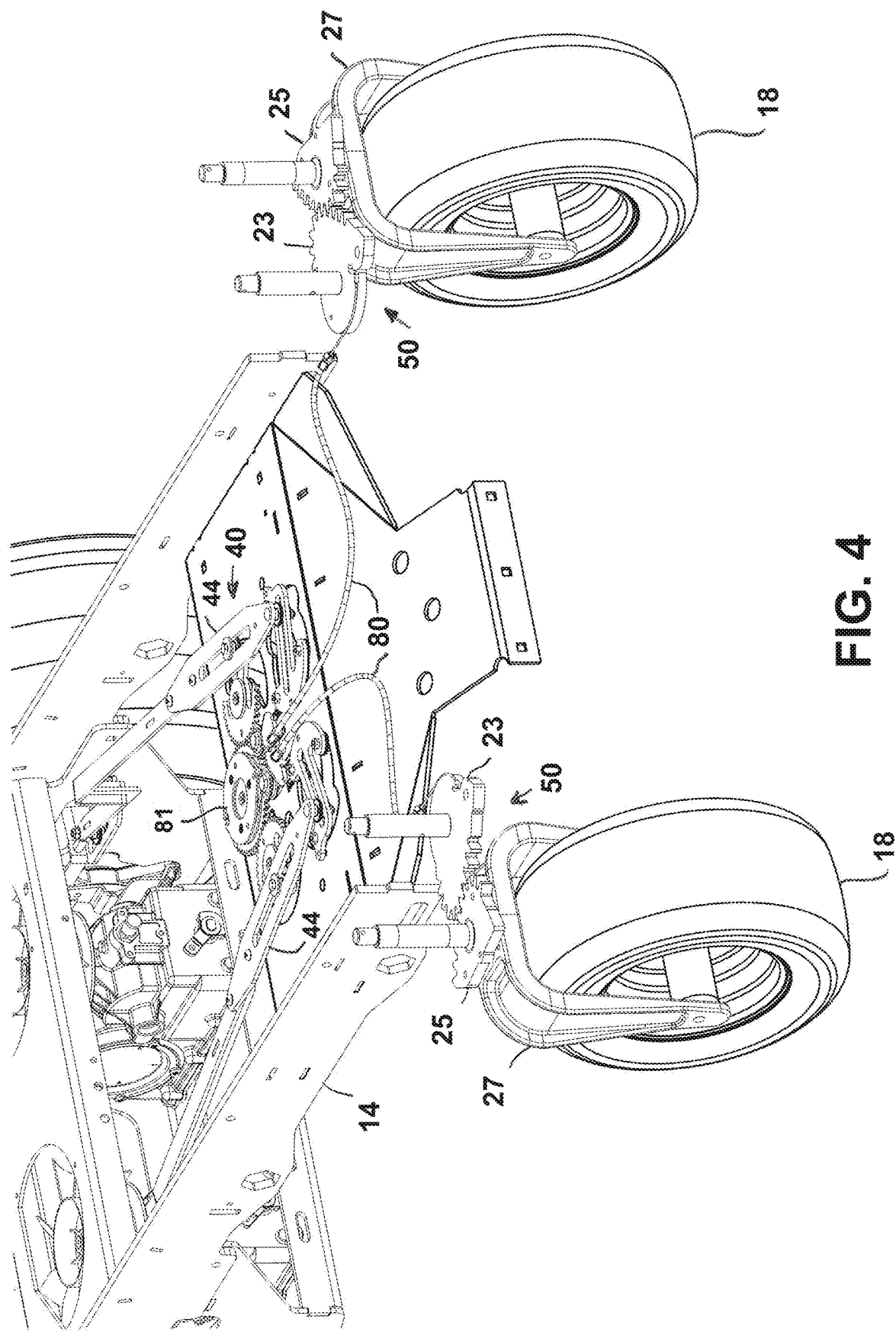
FIG. 4 is a partial perspective view of the control assembly of the vehicle of FIG. 1.

As shown in FIG. 3, each integration link 44 is coupled to a drive link 104, which is in turn coupled to a control mechanism 106 for drive unit 59. Integration link 44 and drive link 104 may be integral components in certain embodiments. As explained more fully below, integration link 44 delivers an integrated steering and speed signal (when a speed signal has been inputted) to drive unit 59 that controls the rotational speed and direction of the attached drive wheel 16. The integrated steering and speed signal is affected by the steering input from steering input device 24, if any, and the speed input of speed control device 71 (or speed control device 79, as the case may be).

Integration link 44 can be moved from a neutral position toward drive unit 59 (toward the rear of vehicle 10). Such movement may be characterized as being along the longitudinal axis of the integration link. With such movement, control mechanism 106 is manipulated so that drive unit 59 rotates its corresponding drive wheel 16 in a forward direction. Conversely, if integration link 44 is moved away from drive unit 59 from a neutral position, control mechanism 106 is manipulated so that drive unit 59 rotates drive wheels 16 in a reverse direction. If integration link 44 is not moved from a neutral position longitudinally toward or away from drive unit 59, control mechanism 106 will not be manipulated. Consequently, drive unit 59 will not cause forward or reverse rotation of drive wheel 16. In other embodiments, drive link 104 may be coupled to control mechanism 106 such that rearward movement of integration link 44 causes reverse, rather than forward, rotation of drive wheel 16 (and forward movement of integration link 44 may cause forward rotation of drive wheel 16).

Figure 9:
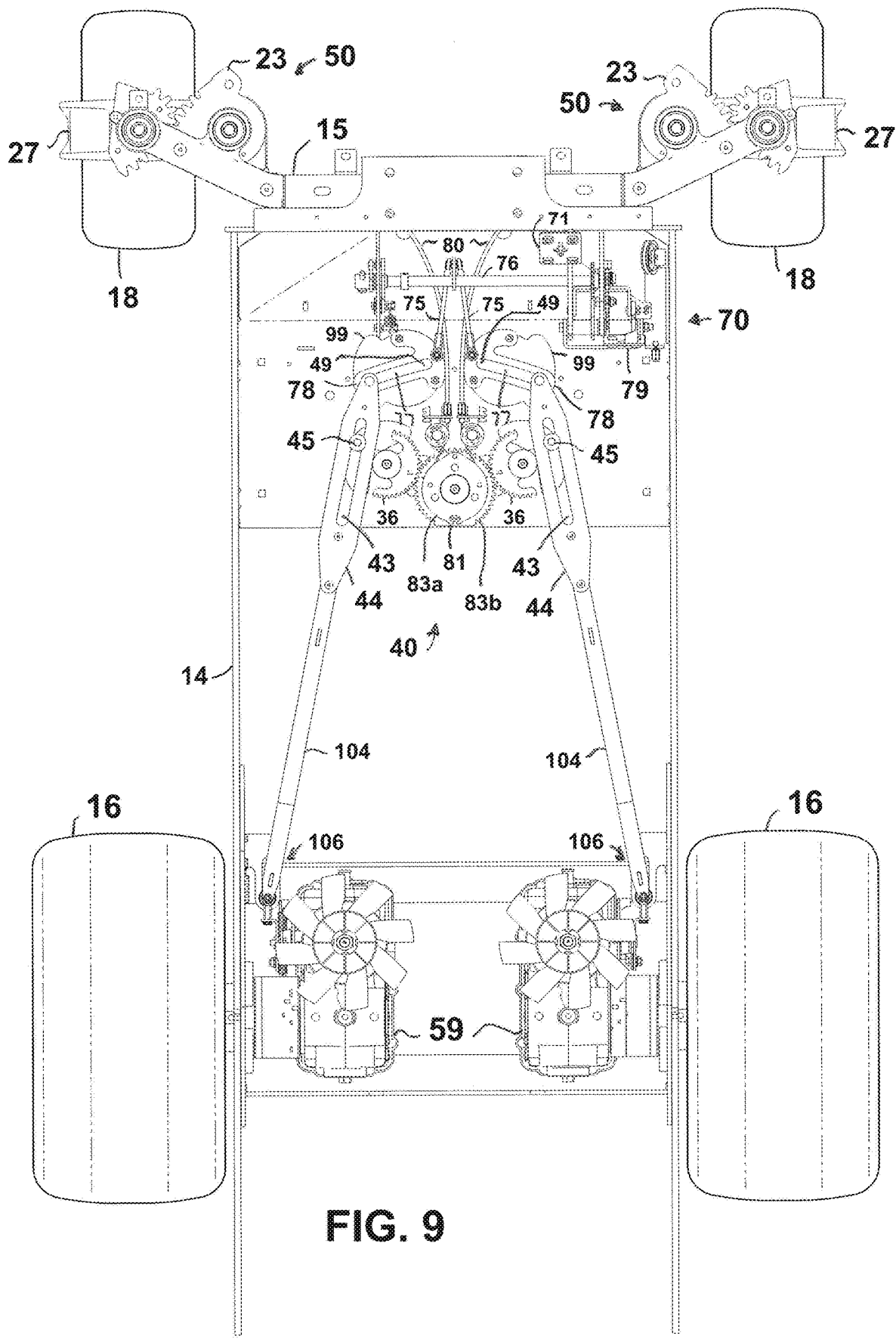
FIG. 9 illustrates a top view of the control and steering assemblies of the vehicle of FIG. 1 with a neutral steering input and a forward speed input.
Figure 10:
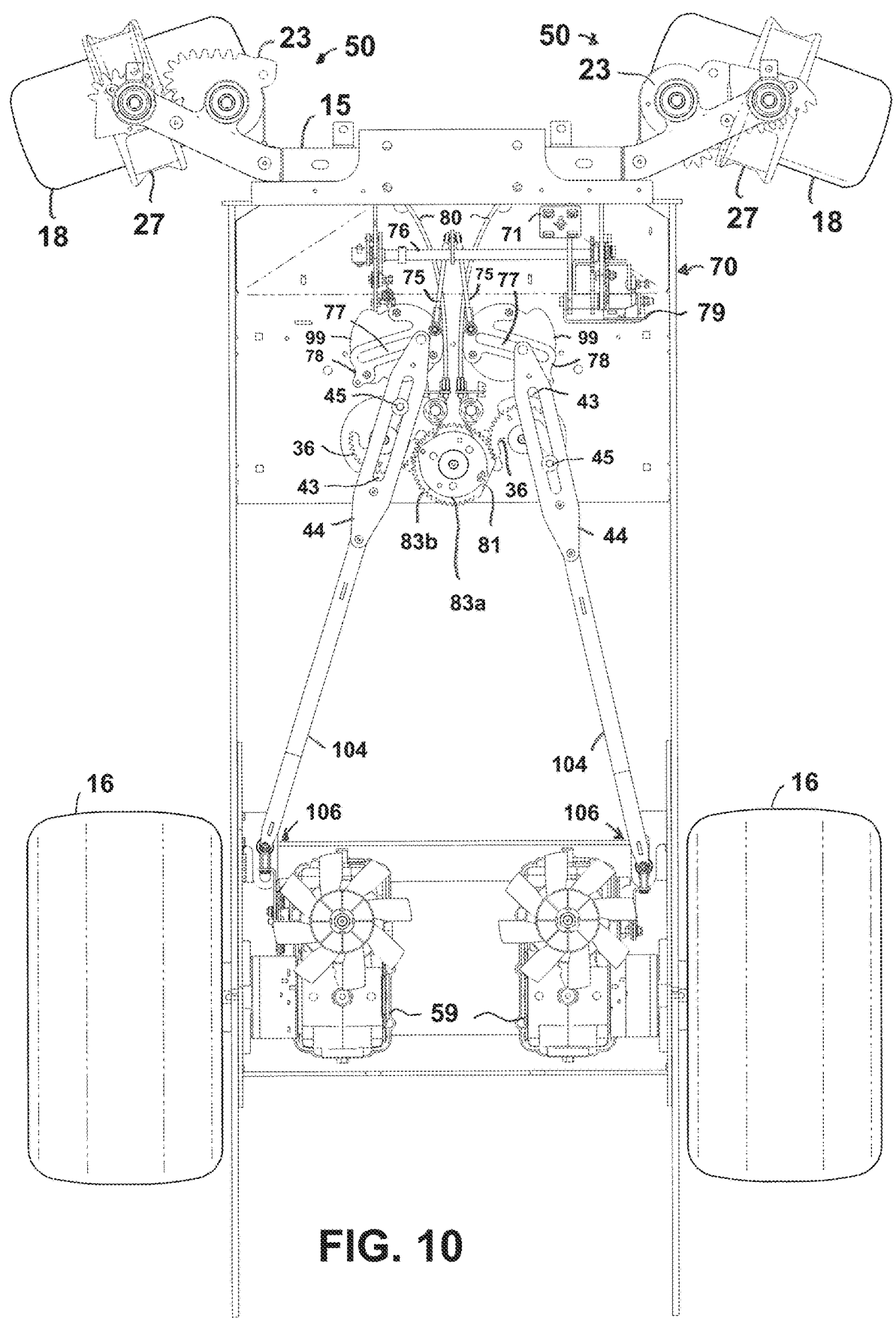
FIG. 10 illustrates a top view of the control and steering assemblies of the vehicle of FIG. 1 with a left turn steering input and a forward speed input.
Figure 11:
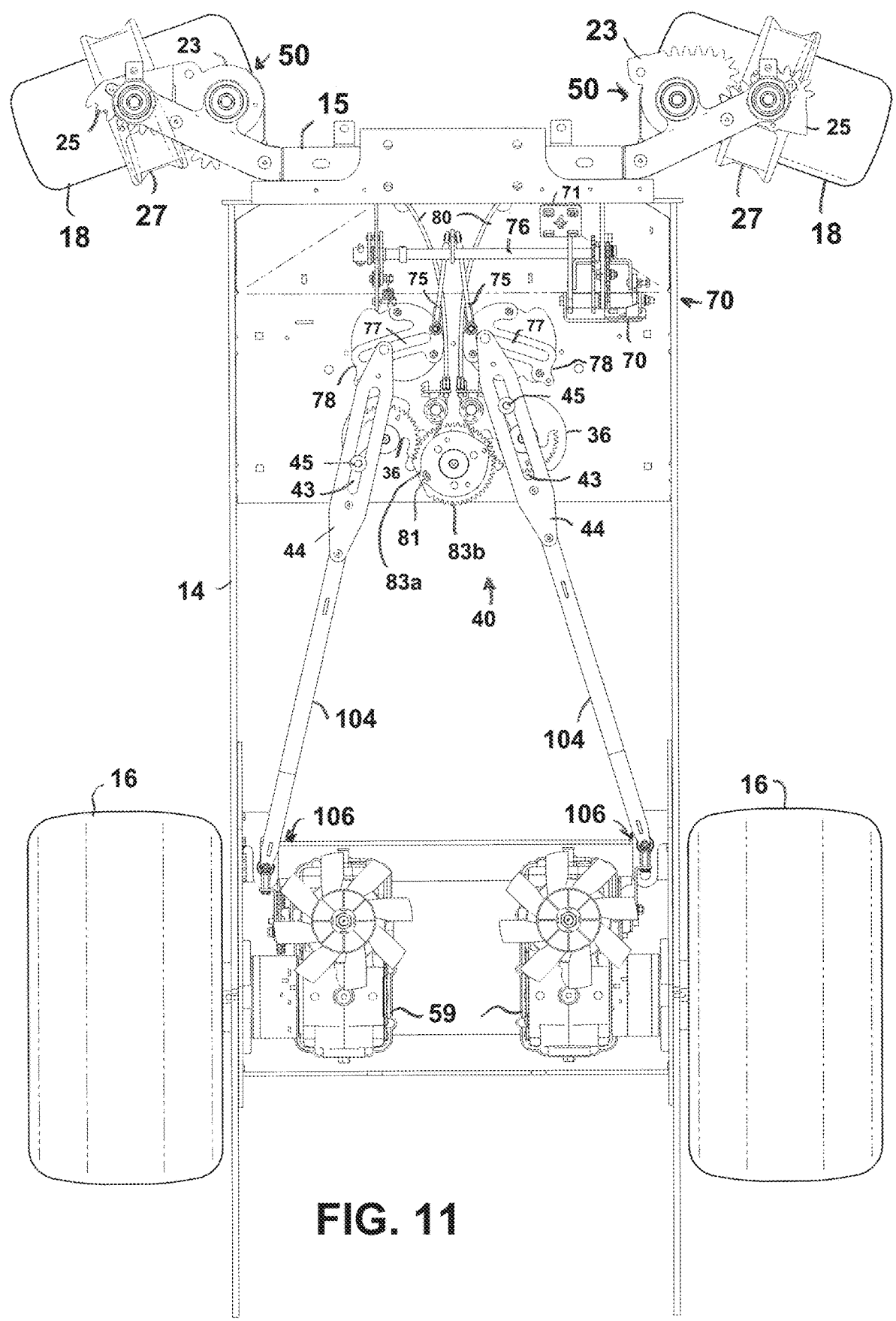
FIG. 11 illustrates a top view of the control and steering assemblies of the vehicle of FIG. 1 with a right turn steering input and a forward speed input.

FIGS. 9-11 illustrate views of control system 40 with a full forward speed input from speed control device 71 and neutral, left turn, and right turn steering inputs, respectively, from steering input device 24. As shown in the comparison of FIGS. 6 and 9, when speed control device 71 is provided with a forward speed input, outer ends 51 of slots 77 are moved towards the rear of vehicle 10, and inner ends 49 of slots 77 are moved towards the front of vehicle 10.

As shown in FIG. 9, with neutral steering and full forward input from speed control device 71, both integration links 44 are pushed toward the rear of vehicle 10 an equal amount. With right and left integration links 44 moved from a speed-neutral position toward drive units 59, both drive units 59 will cause drive wheels 16 to rotate in a forward direction. As shown in FIG. 9, steering input device 24 is in a neutral position, therefore both front wheel assemblies 50 are positioned so that the front wheels 18 would direct vehicle 10 straight ahead. In FIG. 9, each integration link 44 is placed in an equivalent relative position within slot 77. Therefore, each integration link 44 is moved an equivalent amount toward the rear of vehicle 10 when speed control device 71 is manipulated. As a result, the drive units 59 are manipulated to rotate drive wheels 16 at equivalent forward rotational speeds. Drive wheels 16 will therefore work in conjunction with front wheels 18 to cause vehicle 10 to maintain a forward path straight ahead.

However, as steering input device 24 is manipulated to cause a right or left turn for vehicle 10, control system 40 causes right and left drive wheels 16 to rotate at different speeds. By rotating the right and left drive wheels 16 at different speeds, the drive wheels are able to assist vehicle 10 in turning. In particular, the outside drive wheel 16 (the drive wheel farthest from the center of the turning arc) can rotate at a faster rotational speed than the inside drive wheel. In sharp turns, the outside and inside drive wheels may also rotate in opposite directions. When the rotation of right and left drive wheels 16 is coordinated with the angle of front wheels 18, vehicle 10 can make small- or zero-radius turns and reduce the likelihood of a wheel skidding and damaging the turf or vegetation below vehicle 10.

Referring now to FIG. 10, speed control device 71 is placed in the full forward position, and steering input device 24 has been manipulated so that steering assembly 20 configures front wheel assemblies 50 for a left turn. Control system 40 receives steering input from wheel assemblies 50 via flexible members 80. Control system 40 is therefore configured for a full-forward speed left turn in FIG. 10. Comparing FIG. 10 (full-forward speed left turn) to FIG. 7 (neutral speed input, left turn), right integration link 44 has been shifted rearward from the neutral position in FIG. 7. In addition, left integration link 44 has been shifted forward. As a result, right drive wheel 16 will rotate in a forward direction, while left drive wheel 16 will rotate in a reverse direction. This combined rotation of the drive wheels 16 in opposite directions will assist vehicle 10 in making a small- or zero-radius turn.

As shown in FIGS. 9 and 10, outer ends 51 (rather than inner ends 49) of slots 77 are closer to the rear of vehicle 10. Therefore, as steering input device 24 is turned and integration links 44 are translated away from the center of vehicle 10, integration links 44 and drive links 104 will also be moved rearward towards the rear of vehicle 10. Each control mechanism 106 will therefore also be rotated toward its respective drive unit 59, so that the forward rotational speed of each drive wheel 16 is increased. Control system 40 is configured such that integration link 44 associated with inner drive wheel 16 will be shifted forward more than integration link 44 associated with outer drive wheel 16. Consequently, the forward rotational speed of inner drive wheel 16 will be reduced more than that of outer drive wheel 16. When steering input device 24 is provided with a sufficient amount of input, the inner drive wheel 16 will eventually cease forward rotation and begin reverse rotation. This combined rotation of the drive wheels 16 in opposite directions will assist vehicle 10 in making a small- or zero-radius left turn.

Referring now to FIG. 11, control system 40 is configured for a full-forward speed input and a full right turn. This configuration is equivalent to FIG. 10, with the exception that steering input device 24 (shown in FIG. 3) has been turned to the right instead of the left. In this configuration, right integration link 44 is positioned so that right drive unit 59 will provide a reverse rotation of inner (right) drive wheel 16. Vehicle 10 can therefore perform a small- or zero-radius turn to the right.

Figure 12:
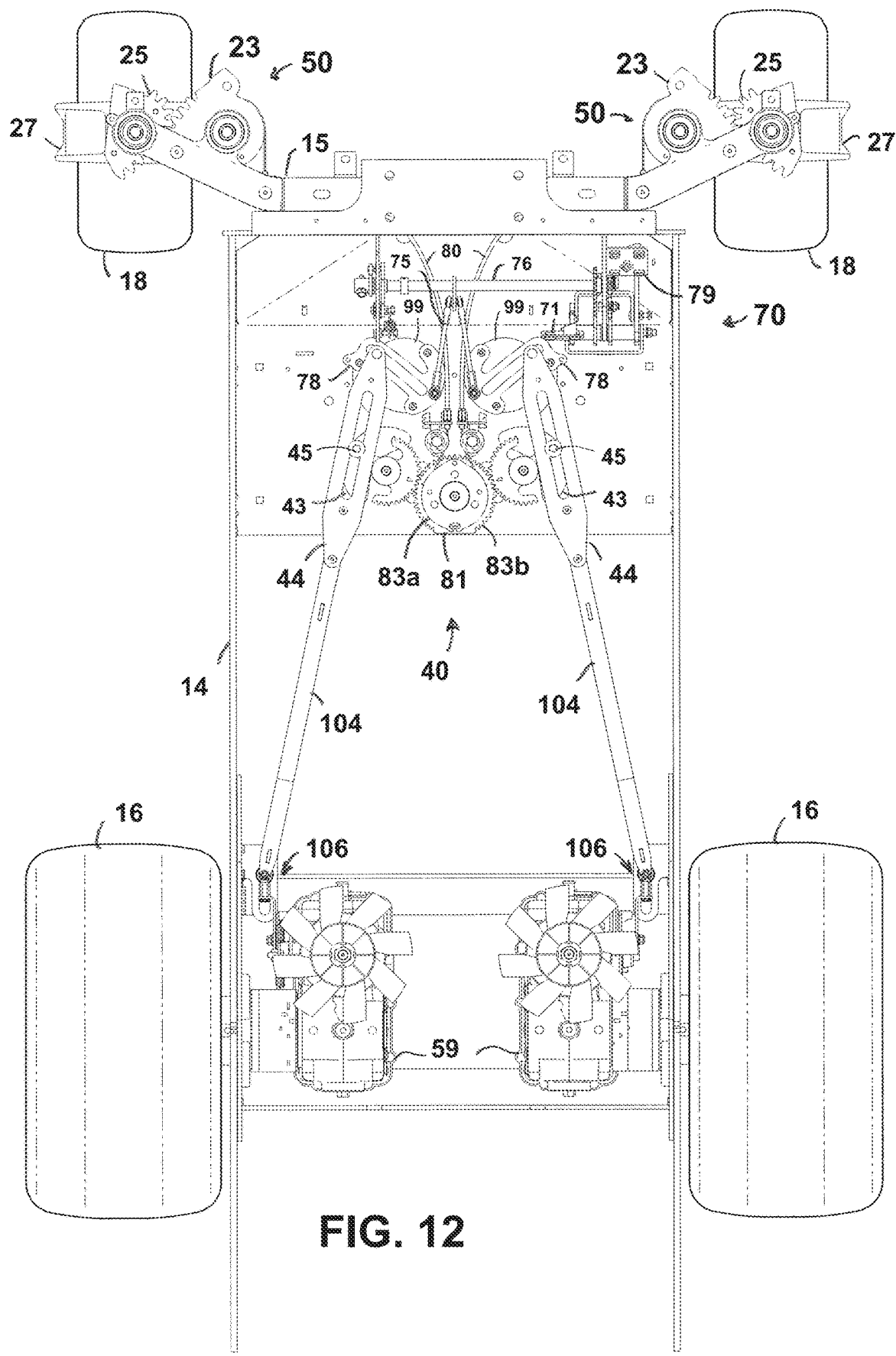
FIG. 12 illustrates a top view of the control and steering assemblies of the vehicle of FIG. 1 with a neutral steering input and a reverse speed input.
Figure 13:
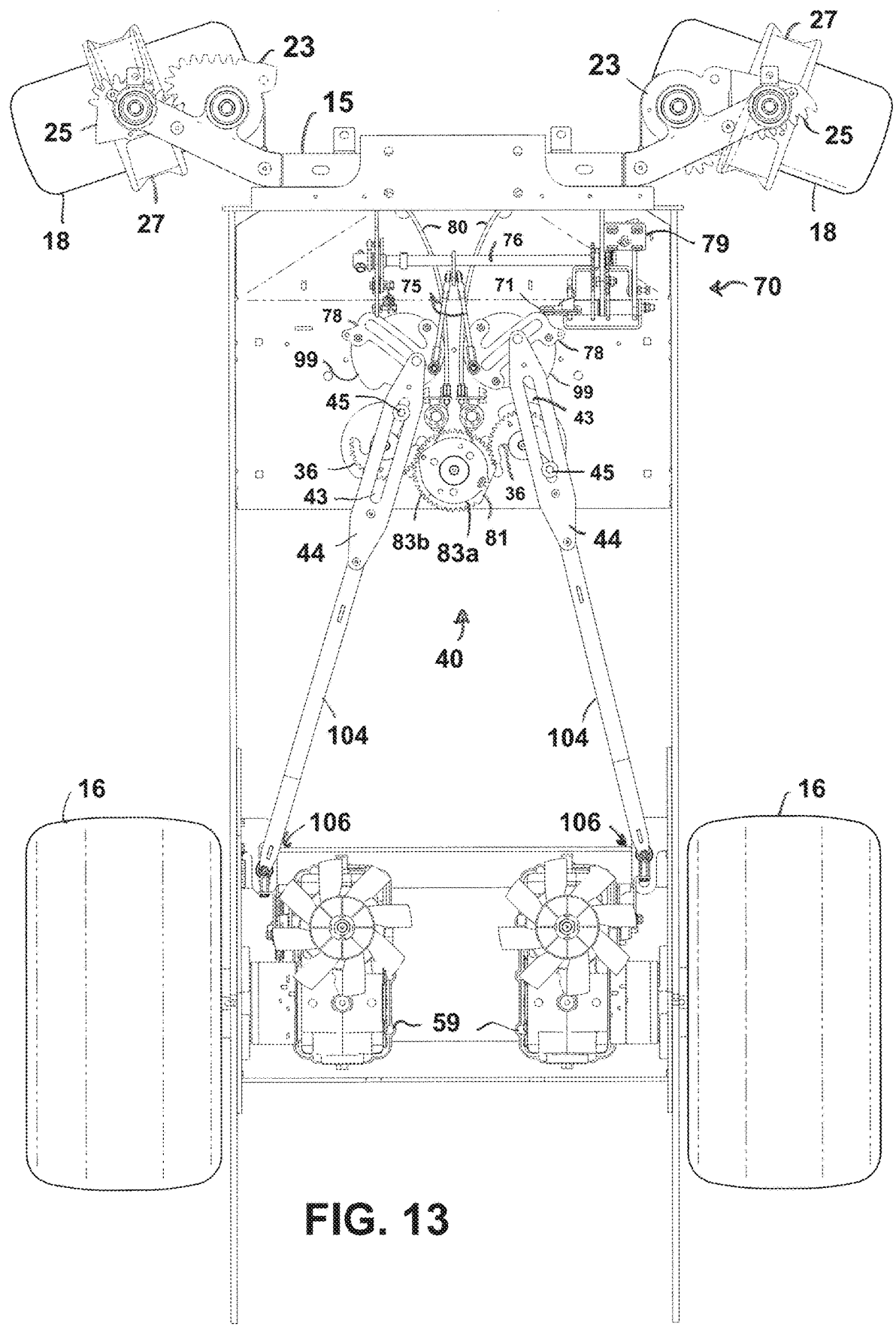
FIG. 13 illustrates a top view of the control and steering assemblies of the vehicle of FIG. 1 with a left turn steering input and a reverse speed input.
Figure 14:
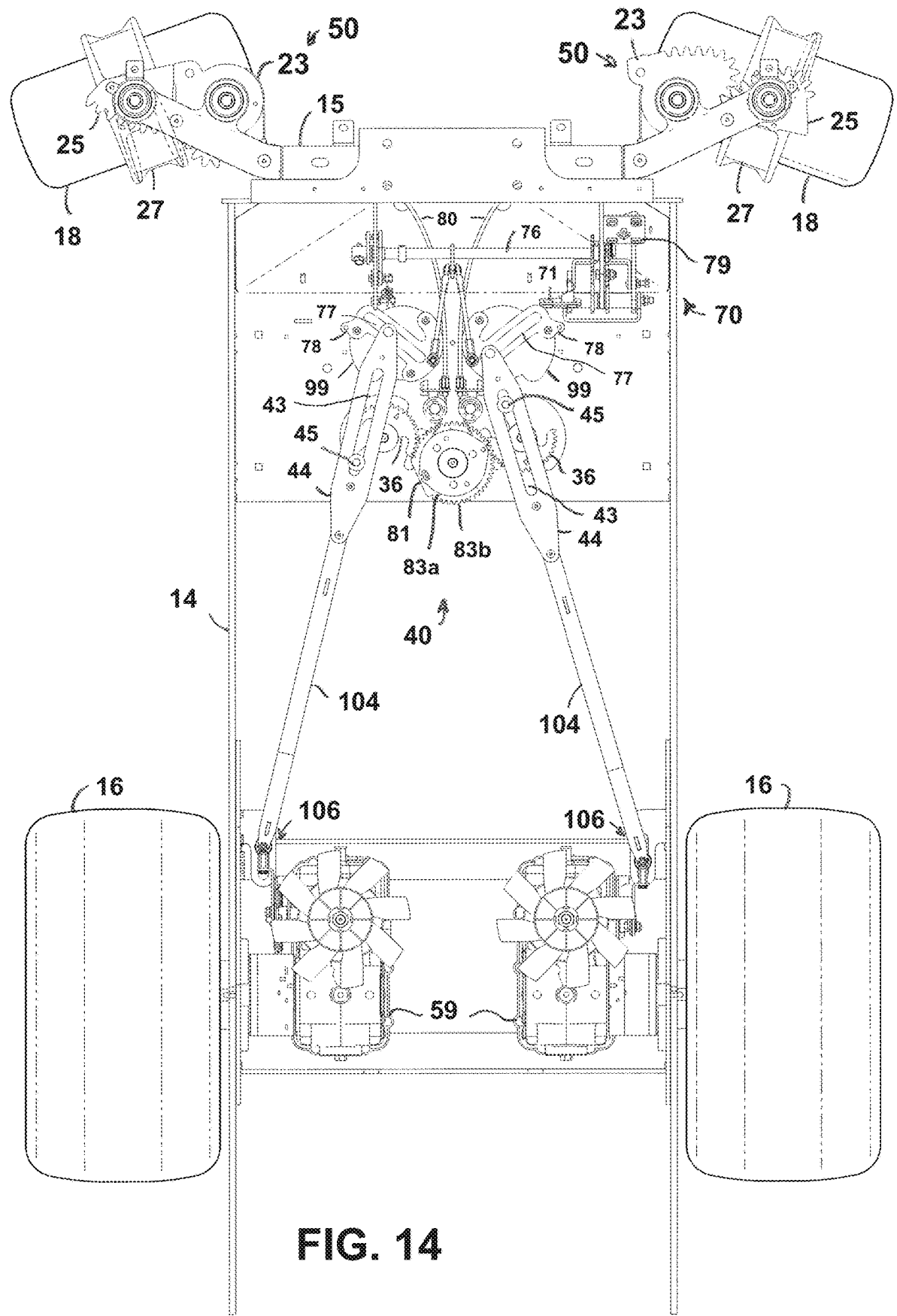
FIG. 14 illustrates a top view of the control and steering assemblies of the vehicle of FIG. 1 with a right turn steering input and a reverse speed input.

Referring now to FIGS. 12-14, speed control device 79 has been positioned to provide a reverse speed input to control system 40. In FIG. 12, control system 40 is configured for a neutral steering input. In FIGS. 13 and 14, control system 40 is configured for a left-turn and a right-turn, respectively. In FIGS. 12-14, speed input members 78 are positioned so that inner ends 49 (rather than outer ends 51) of slots 77 are closer to the rear of vehicle 10. Therefore, as integration links 44 move inward (toward the center of vehicle 10) in response to a steering input, they will also move toward the rear of vehicle 10. As a result, control mechanism 106 will reduce the reverse rotational speed of each drive wheel 16. If a sufficient steering input is provided, integration link 44 associated with inside drive wheel 16 will be pushed far enough rearward to cause inside drive wheel to cease reverse rotation and begin forward rotation. Inside drive wheel 16 can therefore rotate forward and outside drive wheel 16 can rotate in reverse during a full turn with a reverse speed input.

In FIG. 13, control system 40 is positioned for a left turn and speed control device 79 is positioned for a reverse speed input. The left integration link 44 is pushed sufficiently rearward so that left (inside) drive wheel 16 will rotate forward. Right integration link 44 is placed sufficiently forward so that outer (right) drive wheel 16 will rotate in reverse. With this configuration, vehicle 10 can make a small or zero-radius reverse left turn.

Referring now to FIG. 14, control system 40 is positioned for a right turn with speed control device 79 providing a reverse speed input. The right integration link 44 is pushed sufficiently rearward so that right (inside) drive wheel 16 will rotate forward. Left integration link 44 is placed sufficiently forward so that outer (left) drive wheel 16 rotates in reverse. With this configuration, vehicle 10 can make a small- or zero-radius reverse right turn.

Referring now to FIG. 15, an alternate embodiment of the present control systems is shown. Control system 140 is similar to previously-described control system 40. Control system 140, however, does not comprise a flexible member or flexible members coupled to steering assemblies for front steerable wheels. Instead, control system 140 comprises a steering input gear 180 operatively engaged with control member 181 (which, in the depicted embodiment, is a geared member, like control member 81). In exemplary embodiments, steering input gear 180 can be coupled to a steering input device (not shown) such as a steering wheel.

Similar to the previously described embodiment, control member 181 is operatively engaged with integration members 136 (which, in the depicted embodiment, are geared members, like integration member 36), which are in turn coupled to integration links 144 via coupling members 145. Also similar to the previously described embodiment, integration links 144 are coupled to speed input members 178, which are coupled to a speed input device (not shown), including for example a throttle pedal. Each integration link 144 can be coupled to a drive unit (not shown), such as hydrostatic transmission or a drive unit that includes an electric motor, in a manner similar to the previously described embodiment.

During operation, steering input gear 180 can be rotated (e.g., via rotation of a steering input device) such that control member 181 is also rotated. The rotation of control member 181 also provides for the rotation of integration members 136 such that rotation of control member 181 also rotates integration members 136. The rotation of integration members 136 provides for the lateral pivoting of integration links 144 in a manner similar to the previously described embodiment. When speed input members 178 receive a speed input, slots 177 of speed input members 178 will be positioned at an angle such that lateral pivoting of integration links 144 will also provide a forward or rearward translation of integration links 144. As described in the previous embodiment, the differentiation of the forward or rearward positioning of integration links 144 provides for different speed inputs to the right and left drive units and can assist in turning the vehicle. Control system 140 is suitable for use in any vehicle with drive units that may be independently controlled to effect (or help effect) a turn of the vehicle.

Descriptions of well known manufacturing and assembly techniques, components and equipment have been omitted so as not to unnecessarily obscure the present systems and devices in unnecessary detail. Further, the present systems and devices are not intended to be limited to the particular forms disclosed. Rather, they are to cover all modifications, equivalents, and alternatives falling within the scope of the claims.

For example, the control members may be configured differently than shown in the figures. In alternative embodiments, the integration member that is a rigid structure configured to affect the position of the integration links relative to the speed input members of a given vehicle control system can be a single structure, rather than two structures as shown in the depicted embodiment; for example, the integration member can be a rigid structure that is connected to the control member and rotates with it (like an angled bar pinned to the control member and having the same rotational axis as the control member) and that includes coupling members (or followers) that are positioned in the slots (or cams) of the integration links. Furthermore, the drive rods and the integration links may be a single component rather than separate components. In still other embodiments, the linkage coupling the speed control device to the speed input members may be a different configuration from that shown. For example, the linkage may be coupled to a single speed input member, which in turn provides an input to the other speed input member via a geared engagement at the ends of the speed input members. As another example, in other embodiments, the guide rollers (shown but not labeled in the figures) that are adjacent the flexible members and proximate to the control member may be eliminated.

The appended claims are not to be interpreted as including means-plus-function limitations, unless such a limitation is explicitly recited in a given claim using the phrase(s) "means for" and/or "step for," respectively.

The invention claimed is:

1. A vehicle control system comprising:
   a first steering system for a first steerable wheel of a vehicle, wherein the first steering system comprises a first steering input member coupled to a steering input device;
   a control member coupled to the first steering input member such that the control member can receive a steering input from the first steering input member when the vehicle is stationary;
   a first flexible member configured to transmit a steering input from the first steering input member to the control member;
   a first integration link coupled to the control member and to a first drive unit;
   a second steering system for a second steerable wheel of the vehicle, wherein the second steering system comprises a second steering input member, and the control member is coupled to the second steering input member such that the control member can receive a steering input from the second steering input member when the vehicle is stationary; and
   a second integration link coupled to the control member and to a second drive unit.

2. The vehicle control system of claim 1, wherein the control member is configured to rotate as a result of receiving a steering input from the first steering input member.

3. The vehicle control system of claim 1, wherein the first flexible member comprises a cable.

4. A vehicle control system comprising:
   a first steering system for a first steerable wheel of a vehicle, wherein the first steering system comprises a first steering input member coupled to a steering input device;
   a control member coupled to the first steering input member such that the control member can receive a steering input from the first steering input member when the vehicle is stationary;
   a first integration link coupled to the control member and to a first drive unit;
   a second steering system for a second steerable wheel of the vehicle, wherein the second steering system comprises a second steering input member, and the control member is coupled to the second steering input member such that the control member can receive a steering input from the second steering input member when the vehicle is stationary; and
   a second integration link coupled to the control member and to a second drive unit;
   wherein:
      the first steering system for the first steerable wheel comprises a first steering gear member coupled to a first wheel support;
      the first steering input member is operatively engaged with the first steering gear member;
      the second steering system for the second steerable wheel comprises a second steering gear member coupled to a second wheel support; and
      the second steering input member is operatively engaged with the second steering gear member.

5. A vehicle control system comprising:
   a first steering system for a first steerable wheel of a vehicle, wherein the first steering system comprises a first steering input member coupled to a steering input device;

a control member coupled to the first steering input member such that the control member can receive a steering input from the first steering input member when the vehicle is stationary;

a first integration link coupled to the control member and to a first drive unit;

a second steering system for a second steerable wheel of the vehicle, wherein the second steering system comprises a second steering input member, and the control member is coupled to the second steering input member such that the control member can receive a steering input from the second steering input member when the vehicle is stationary;

a second integration link coupled to the control member and to a second drive unit; and a second flexible member configured to transmit a steering input from the second steering input member to the control member.

6. A vehicle control system comprising:
a first steering system for a first steerable wheel of a vehicle, wherein the first steering system comprises a first steering input member coupled to a steering input device;

a control member coupled to the first steering input member such that the control member can receive a steering input from the first steering input member when the vehicle is stationary;

a first integration link coupled to the control member and to a first drive unit;

a second steering system for a second steerable wheel of the vehicle, wherein the second steering system comprises a second steering input member, and the control member is coupled to the second steering input member such that the control member can receive a steering input from the second steering input member when the vehicle is stationary;

a second integration link coupled to the control member and to a second drive unit;

a first speed input device coupled to a first speed input member; and a first integration member coupled to the first speed input member through the first integration link.

7. A vehicle control system comprising:
a control member that will move as a result of movement of a steering input device;

a first integration link coupled to the control member when the vehicle is stationary and to a first drive unit; and a first integration member coupled to the first integration link such that rotational movement of the control member will cause movement of the first integration member, which will cause movement of the first integration link;

wherein the first integration member is not attached to a rigid link that extends forward of the control member.

8. The vehicle control system of claim 7, further comprising:
a second integration link coupled to the control member and to a second drive unit.

9. The vehicle control system of claim 7, further comprising a second integration member operatively engaged with the control member and coupled to the second integration link such that rotational movement of the control member will cause movement of the second integration member, which will cause movement of the second integration link.

10. A vehicle control system comprising:
a control member that will move as a result of movement of a steering input device;

a first integration link coupled to the control member and to a first drive unit;

a first integration member coupled to the first integration link such that rotational movement of the control member will cause movement of the first integration member, which will cause movement of the first integration link;

a second integration member operatively engaged with the control member and coupled to the second integration link such that rotational movement of the control member will cause movement of the second integration member, which will cause movement of the second integration link;

a first coupling member coupling the first integration member to the first integration link; and a second coupling member coupling the second integration member to the second integration link;

wherein at least a portion of the first coupling member is positioned in a slot of the first integration link and at least a portion of the second coupling member is positioned in a slot of the second integration link; and wherein the first integration member is not attached to a rigid link that extends forward of the control member.

11. A vehicle control system comprising:
a first speed input device coupled to a first speed input member;

a control member that will move as a result of movement of a steering input device;

a first integration link coupled to the control member and to a first drive unit; and a first integration member coupled to the first integration link such that rotational movement of the control member will cause movement of the first integration member, which will cause movement of the first integration link;

wherein the first integration member is coupled to the first speed input member through the first integration link; and wherein the first integration member is not attached to a rigid link that extends forward of the control member.

12. A vehicle control system for a vehicle with left and right steerable wheels, the vehicle control system comprising:
a control member that will move as a result of movement of a steering input device;

a first integration link coupled to the control member and to a first drive unit; and a first integration member coupled to the first integration link such that rotational movement of the control member will cause movement of the first integration member, which will cause movement of the first integration link;

wherein the vehicle control system is configured so as to not send a steering signal forward of the control member to either a first steering input gear for the first steerable wheel or a second steering input gear for the second steerable wheel.

13. The vehicle control system of claim 12, further comprising:
a second integration link coupled to the control member and to a second drive unit.

14. The vehicle control system of claim 12, further comprising:

a first coupling member coupling the first integration member to the first integration link; and a second coupling member coupling the second integration member to the second integration link;

wherein at least a portion of the first coupling member is positioned in a slot of the first integration link and at least a portion of the second coupling member is positioned in a slot of the second integration link.

15. The vehicle control system of claim 14, wherein the first and second integration members are configured to rotate in the same plane in response to a rotation of the control member.

16. The vehicle control system of claim 12, further comprising:

a first speed input device coupled to a first speed input member;

wherein the first integration member is coupled to the first speed input member through the first integration link.

17. The vehicle control system of claim 16, wherein the first speed input member includes a slot.

18. The vehicle control system of claim 17, wherein the first integration link is coupled to the first speed input member so as to be capable of affecting a position of the slot.

* * * * *